United States Patent
Arai

(10) Patent No.: US 8,854,949 B2
(45) Date of Patent: Oct. 7, 2014

(54) NETWORK RELAY DEVICE AND NETWORK RELAY METHOD

(75) Inventor: Masaya Arai, Atsugi (JP)

(73) Assignee: Alaxala Networks Corporation, Kawasaki (JP)

(*) Notice: Subject to any disclaimer, the term of this patent is extended or adjusted under 35 U.S.C. 154(b) by 321 days.

(21) Appl. No.: 13/399,296

(22) Filed: Feb. 17, 2012

(65) Prior Publication Data

US 2012/0294139 A1 Nov. 22, 2012

(30) Foreign Application Priority Data

May 19, 2011 (JP) .................... 2011-112021

(51) Int. Cl.
 H04L 12/26 (2006.01)
 H04L 12/46 (2006.01)
 H04L 12/18 (2006.01)
 H04L 12/437 (2006.01)
 H04L 12/703 (2013.01)
 H04L 12/761 (2013.01)

(52) U.S. Cl.
 CPC .......... *H04L 12/185* (2013.01); *H04L 12/4641* (2013.01); *H04L 45/28* (2013.01); *H04L 12/437* (2013.01); *H04L 45/16* (2013.01)
 USPC .......... 370/216; 370/254; 370/389; 370/401; 709/224

(58) Field of Classification Search
 None
 See application file for complete search history.

(56) References Cited

U.S. PATENT DOCUMENTS

| | | | |
|---|---|---|---|
| 6,148,005 A | 11/2000 | Paul et al. | |
| 7,778,266 B2 | 8/2010 | Akahane et al. | |
| 7,903,647 B2* | 3/2011 | Kanekar et al. | 370/389 |
| 2004/0223501 A1* | 11/2004 | Mackiewich et al. | 370/401 |
| 2012/0188934 A1* | 7/2012 | Liu et al. | 370/312 |

FOREIGN PATENT DOCUMENTS

| | | |
|---|---|---|
| EP | 2 079 198 A1 | 7/2009 |
| JP | 2007-324688 A | 12/2007 |

OTHER PUBLICATIONS

Shah, S. et al.; RFC 3619—Extreme Networks' Ethernet Automatic Protection Switching (EAPS) Version 1; Oct. 2003; 4 pages.
European Patent Office Communication and partial European Search Report on application 12157476.8 dated Sep. 3, 2012; 6 pages.
European Patent Office extended search report on application 12157476.8 mailed Feb. 13, 2013; 17 pages.

* cited by examiner

*Primary Examiner* — Chi Pham
*Assistant Examiner* — Shick Hom
(74) *Attorney, Agent, or Firm* — Foley & Lardner LLP

(57) ABSTRACT

A network relay device relays data in a layer 2 network. The network relay device includes first and second communication ports, a snooping module, a transfer information storage unit, a multicast sending module, a failure detector and a port adding module. The snooping module generates snooping information. The snooping information correlates the first communication port set to a multicast transfer port to a destination MAC address. The multicast sending module refers to the snooping information stored in the transfer information storage unit and sends a multicast frame received from the layer 2 network, from the correlated multicast transfer port. The failure detector detects a communication failure in the layer 2 network. The port adding module additionally, in response to detection of the communication failure by the failure detector, set the second communication port, in addition to the first communication port, to the multicast transfer port.

12 Claims, 18 Drawing Sheets

Fig.3

NETWORK SETTINGS INFORMATION — 182_1

VLAN1: TAGGED PORTS (40_12), (40_14)

VLAN2: TAGGED PORTS (40_12), (40_14)
UNTAGGED PORT (40_10)
SNOOPING TARGET

⋮

VLAN10: TAGGED PORTS (40_12), (40_14)
SNOOPING TARGET

RING NETWORK RN1: MASTER NODE
CONTROL VLAN: VLAN1
OBJECTS VLANS: VLAN2 − 10
RING PORTS (40_12), (40_14)

RING NETWORK RN2: MASTER NODE
CONTROL VLAN: VLAN11
OBJECT VLANS: VLAN12 − 20
RING PORTS (40_15), (40_16)

Fig.4

NETWORK SETTINGS INFORMATION — 182_2

VLAN1: TAGGED PORTS (40_21), (40_23)

VLAN2: TAGGED PORTS (40_21), (40_23)
UNTAGGED PORT (40_20)
SNOOPING TARGET

⋮

VLAN10: TAGGED PORTS (40_21), (40_23)
SNOOPING TARGET

RING NETWORK RN1: TRANSIT NODE
CONTROL VLAN: VLAN1
OBJECTS VLANS: VLAN2 − 10
RING PORTS (40_21), (40_23)

Fig.7A

| DESTINATION MAC ADDRESS | VLAN NUMBER | MULTICAST TRANSFER PORT | |
|---|---|---|---|
| MAC_MG1 | 2 | 40_10 | 186_1 |
| ⋮ | ⋮ | ⋮ | |

Fig.7B

| DESTINATION MAC ADDRESS | VLAN NUMBER | MULTICAST TRANSFER PORT | |
|---|---|---|---|
| MAC_MG1 | 2 | 40_21 | 186_2 |
| ⋮ | ⋮ | ⋮ | |

Fig.7C

| DESTINATION MAC ADDRESS | VLAN NUMBER | MULTICAST TRANSFER PORT | |
|---|---|---|---|
| MAC_MG1 | 2 | 40_32 | 186_3 |
| ⋮ | ⋮ | ⋮ | |

Fig.7D

| DESTINATION MAC ADDRESS | VLAN NUMBER | MULTICAST TRANSFER PORT | |
|---|---|---|---|
| MAC_MG1 | 2 | 40_43 | 186_4 |
| ⋮ | ⋮ | ⋮ | |

Fig.9A

| DESTINATION MAC ADDRESS | VLAN NUMBER | MULTICAST TRANSFER PORT | |
|---|---|---|---|
| MAC_MG1 | 2 | 40_10 | ~186_1 |
| ⋮ | ⋮ | ⋮ | |

Fig.9B

| DESTINATION MAC ADDRESS | VLAN NUMBER | MULTICAST TRANSFER PORT | |
|---|---|---|---|
| MAC_MG1 | 2 | 40_21 ~~40_23~~ | ~186_2 |
| ⋮ | ⋮ | ⋮ | |

Fig.9C

| DESTINATION MAC ADDRESS | VLAN NUMBER | MULTICAST TRANSFER PORT | |
|---|---|---|---|
| MAC_MG1 | 2 | ~~40_32~~ 40_34 | ~186_3 |
| ⋮ | ⋮ | ⋮ | |

Fig.9D

| DESTINATION MAC ADDRESS | VLAN NUMBER | MULTICAST TRANSFER PORT | |
|---|---|---|---|
| MAC_MG1 | 2 | 40_41 40_43 | ~186_4 |
| ⋮ | ⋮ | ⋮ | |

Fig.12A

| DESTINATION MAC ADDRESS | VLAN NUMBER | MULTICAST TRANSFER PORT | |
|---|---|---|---|
| MAC_MG1 | 2 | 40_10 | 186_1 |
| ⋮ | ⋮ | ⋮ | |

Fig.12B

| DESTINATION MAC ADDRESS | VLAN NUMBER | MULTICAST TRANSFER PORT | |
|---|---|---|---|
| MAC_MG1 | 2 | 40_20 40_21 | 186_2 |
| ⋮ | ⋮ | ⋮ | |

Fig.12C

| DESTINATION MAC ADDRESS | VLAN NUMBER | MULTICAST TRANSFER PORT | |
|---|---|---|---|
| MAC_MG1 | 2 | 40_32 | 186_3 |
| ⋮ | ⋮ | ⋮ | |

Fig.12D

| DESTINATION MAC ADDRESS | VLAN NUMBER | MULTICAST TRANSFER PORT | |
|---|---|---|---|
| MAC_MG1 | 2 | 40_43 | 186_4 |
| ⋮ | ⋮ | ⋮ | |

Fig.14A

| DESTINATION MAC ADDRESS | VLAN NUMBER | MULTICAST TRANSFER PORT | |
|---|---|---|---|
| MAC_MG1 | 2 | 40_10 40_12 40_14 | 186_1 |
| ⋮ | ⋮ | ⋮ | |

Fig.14B

| DESTINATION MAC ADDRESS | VLAN NUMBER | MULTICAST TRANSFER PORT | |
|---|---|---|---|
| MAC_MG1 | 2 | 40_20 40_21 ~~40_23~~ | 186_2 |
| ⋮ | ⋮ | ⋮ | |

Fig.14C

| DESTINATION MAC ADDRESS | VLAN NUMBER | MULTICAST TRANSFER PORT | |
|---|---|---|---|
| MAC_MG1 | 2 | ~~40_32~~ 40_34 | 186_3 |
| ⋮ | ⋮ | ⋮ | |

Fig.14D

| DESTINATION MAC ADDRESS | VLAN NUMBER | MULTICAST TRANSFER PORT | |
|---|---|---|---|
| MAC_MG1 | 2 | 40_41 40_43 | 186_4 |
| ⋮ | ⋮ | ⋮ | |

Fig.19A

| DESTINATION MAC ADDRESS | VLAN NUMBER | MULTICAST TRANSFER PORT | |
|---|---|---|---|
| MAC_MG1 | 2 | 40_10  40_12  40_14 | 186_1 |
| ⋮ | ⋮ | ⋮ | |

Fig.19B

| DESTINATION MAC ADDRESS | VLAN NUMBER | MULTICAST TRANSFER PORT | |
|---|---|---|---|
| MAC_MG1 | 2 | 40_21  ~~40_23~~ | 186_2 |
| ⋮ | ⋮ | ⋮ | |

Fig.19C

| DESTINATION MAC ADDRESS | VLAN NUMBER | MULTICAST TRANSFER PORT | |
|---|---|---|---|
| MAC_MG1 | 2 | ~~40_32~~  40_34 | 186_3 |
| ⋮ | ⋮ | ⋮ | |

Fig.19D

| DESTINATION MAC ADDRESS | VLAN NUMBER | MULTICAST TRANSFER PORT | |
|---|---|---|---|
| MAC_MG1 | 2 | 40_41  40_43 | 186_4 |
| ⋮ | ⋮ | ⋮ | |

NETWORK RELAY DEVICE AND NETWORK RELAY METHOD

CROSS-REFERENCE TO RELATED APPLICATIONS

The present application claims the priority based on Japanese Patent Application No. 2011-112021 filed on May 19, 2011, the disclosure of which is hereby incorporated by reference in its entirety.

BACKGROUND

The present invention relates to a network relay device (layer 2 switch) configured to relay data in a layer 2 network and a relevant network relay method.

IGMP snooping (Internet Group Management Protocol snooping) and MLD snooping (Multicast Listener Discovery snooping) is the known technique to relay a multicast frame with high efficiency in a layer 2 network. In order to prevent flooding of a multicast frame by a layer 2 switch, the IGMP/MLD snooping technique allows the layer 2 switch to snoop a message sent from a host joining a multicast group to a router, learn the transfer destination of the multicast frame and store the learning result in the form of snooping information in the layer 2 switch.

In the event of a communication failure in the layer 2 network adopting the IGMP/MLD snooping technique, there are two possible actions taken by the layer 2 switch. The first action stops relay of the multicast frame, in order to prevent flooding, until the snooping information is re-learnt according to a change in network configuration accompanied by the occurrence of the communication failure. The second action allows flooding of the multicast frame, in order to prevent non-delivery of the multicast frame. In order to shorten the recovery time between the occurrence of a communication failure and relearning of the snooping information, one proposed technique causes the layer 2 switch to send a multicast receiver search message that searches for a node intended to receive multicast packets, in response to detection of the communication failure.

SUMMARY

There have been no sufficient studies to prevent discontinuation of multicast frame relay and flooding during a time period between the occurrence of a communication failure and relearning of snooping information.

Consequently, there is a need to improve the recovery speed of multicast frame relay in the event of a communication failure in a layer 2 network.

In order to achieve at least part of the foregoing, the invention provides various aspects and embodiments described below.

The first aspect of the invention is directed to a network relay device configured to relay data in a layer 2 network. The network relay device includes first and second communication ports, a snooping module, a transfer information storage unit, a multicast sending module, a failure detector, a port adding module. The first and second communication ports are configured to belong to the layer 2 network. The snooping module is configured to generate snooping information, based on snooping with respect to a multicast joining message for notifying of joining to a multicast group. The snooping information correlates the first communication port set to a multicast transfer port, from which a multicast frame is to be transferred, to a destination MAC address of the multicast frame. The transfer information storage unit is configured to store the snooping information. The multicast sending module is configured to refer to the snooping information stored in the transfer information storage unit and send a multicast frame received from the layer 2 network, from the correlated multicast transfer port. The failure detector is configured to detect a communication failure in the layer 2 network. The port adding module is configured to, in response to detection of the communication failure by the failure detector, additionally set the second communication port, in addition to the first communication port, to the multicast transfer port, so as to update the snooping information stored in the transfer information storage unit. The network relay device according to the first aspect ensures relaying a multicast frame in the event of a communication failure by simply adding the setting of the multicast transfer port to the existing snooping information without waiting for relearning the snooping information. This improves the recovery speed of multicast frame relay in the event of a communication failure in the layer 2 network.

According to the second aspect of the invention, the layer 2 network may include a redundancy network, and at least the second communication port between the first and second communication ports may belong to the redundancy network. The network relay device according to the second aspect improves the recovery speed of multicast frame relay in the event of a communication failure in the redundancy network. The redundancy network according to the second aspect may be a ring network conforming to a ring protocol.

According to the third aspect of the invention, the network device may further include a withdrawal sending module. The withdrawal sending module is configured to, when the multicast frame received from the layer 2 network is discarded, send a multicast leaving message for notifying of leaving from the multicast group, to a source of the multicast frame. The network relay device according to the third aspect stops transfer of a multicast frame from its source without waiting for timeout of the communication protocol at the source of the multicast frame. This further improves the recovery speed of multicast frame relay in the event of a communication failure in the layer 2 network. This also advantageously reduces useless transfer of the multicast frame accompanied with the occurrence of a communication failure.

The fourth aspect of the invention is directed to a network system configured to form the layer 2 network with the network relay device. The network system according to the fourth aspect forms the layer 2 network with the improved recovery speed of multicast frame relay in the event of a communication failure.

The fifth aspect of the invention is directed to a network relay method of relaying data in a layer 2 network. The network relay method includes providing first and second communication ports configured to belong to the layer 2 network in a network relay device. The network relay method further includes generating snooping information, based on snooping by the network relay device with respect to a multicast joining message for notifying of joining to a multicast group. The snooping information correlates the first communication port set to a multicast transfer port, from which a multicast frame is to be transferred, to a destination MAC address of the multicast frame. The network relay method further includes storing the snooping information in a transfer information storage unit provided in the network relay device. The network relay method further includes referring to the snooping information stored in the transfer information storage unit and sending a multicast frame received from the layer 2 network, from the correlated multicast transfer port. The network relay method further includes detecting a communication failure in the layer 2 network by the network relay device. The network relay method further includes, in response to detection of the communication failure, additionally setting the second communication port, in addition to the first communication port, to the multicast transfer port, so as to update the snooping information stored in the transfer information storage unit. The network relay method according to the fifth aspect ensures relaying a multicast frame in the event of a communication failure by simply adding the setting of the multicast transfer port to the existing snooping information without waiting for relearning the snooping information. This improves the recovery speed of multicast frame relay in the event of a communication failure in the layer 2 network.

The sixth aspect of the invention is directed to a network relay device configured to relay data in a layer 2 network. The network relay device according to the sixth aspect includes a communication port and a withdrawal sending module. The communication port is configured to belong to the layer 2 network. The withdrawal sending module is configured to, when a multicast frame received from the layer 2 network via the communication port is discarded, send a multicast leaving message for notifying of leaving from a multicast group to a source of the multicast frame. The network relay device according to the sixth aspect stops transfer of a multicast frame from its source without waiting for timeout of the communication protocol at the source of the multicast frame. This improves the recovery speed of multicast frame relay in the event of a communication failure in the layer 2 network. This also advantageously reduces useless transfer of the multicast frame accompanied with the occurrence of a communication failure.

The seventh aspect of the invention is directed to a network system configured to form the layer 2 network with the network relay device according to the sixth aspect. The network system according to the seventh aspect forms the layer 2 network with the improved recovery speed of multicast frame relay in the event of a communication failure.

The eighth aspect of the invention is directed to a network relay method of relaying data in a layer 2 network. The network relay method according to the eighth aspect includes providing a communication port configured to belong to the layer 2 network in a network device. The network relay method according to the eighth aspect further includes, when the network relay device discards a multicast frame received from the layer 2 network via the communication port, sending a multicast leaving message for notifying of leaving from a multicast group, to a source of the multicast frame. The network relay method according to the eighth aspect stops transfer of a multicast frame from its source without waiting for timeout of the communication protocol at the source of the multicast frame. This improves the recovery speed of multicast frame relay in the event of a communication failure in the layer 2 network. This also advantageously reduces useless transfer of the multicast frame accompanied with the occurrence of a communication failure.

The invention is not limited to the network relay device or the network relay method but may be applied to variety of other aspects, for example, a network system including a plurality of network relay devices or a program configured to cause the computer to achieve the functions of the network relay device. The invention is not limited to the above aspects, but a multiplicity of variations and modifications may be made to these aspects without departing from the scope of the invention.

BRIEF DESCRIPTION OF THE DRAWINGS

The invention will be described with reference to the accompanying drawings in which:

FIG. 3 illustrates the details of network settings information;

FIG. 4 illustrates the details of network settings information;

FIGS. 7A to 7D illustrate the details of snooping information;

FIGS. 9A to 9D illustrate the details of the snooping information after the failure handling process;

FIGS. 12A to 12D illustrate the details of snooping information according to the second embodiment;

FIGS. 14*a* to 14D illustrate the details of the snooping information after the failure handling process according to the second embodiment;

FIGS. 19A to 19D illustrate the details of snooping information after the failure handling process according to the third embodiment.

DESCRIPTION OF THE EMBODIMENTS

In order to further clarify the configurations and the operations of the invention, some embodiments of the invention are described below with reference to the accompanied drawings.

A. First Embodiment

Figure 1:
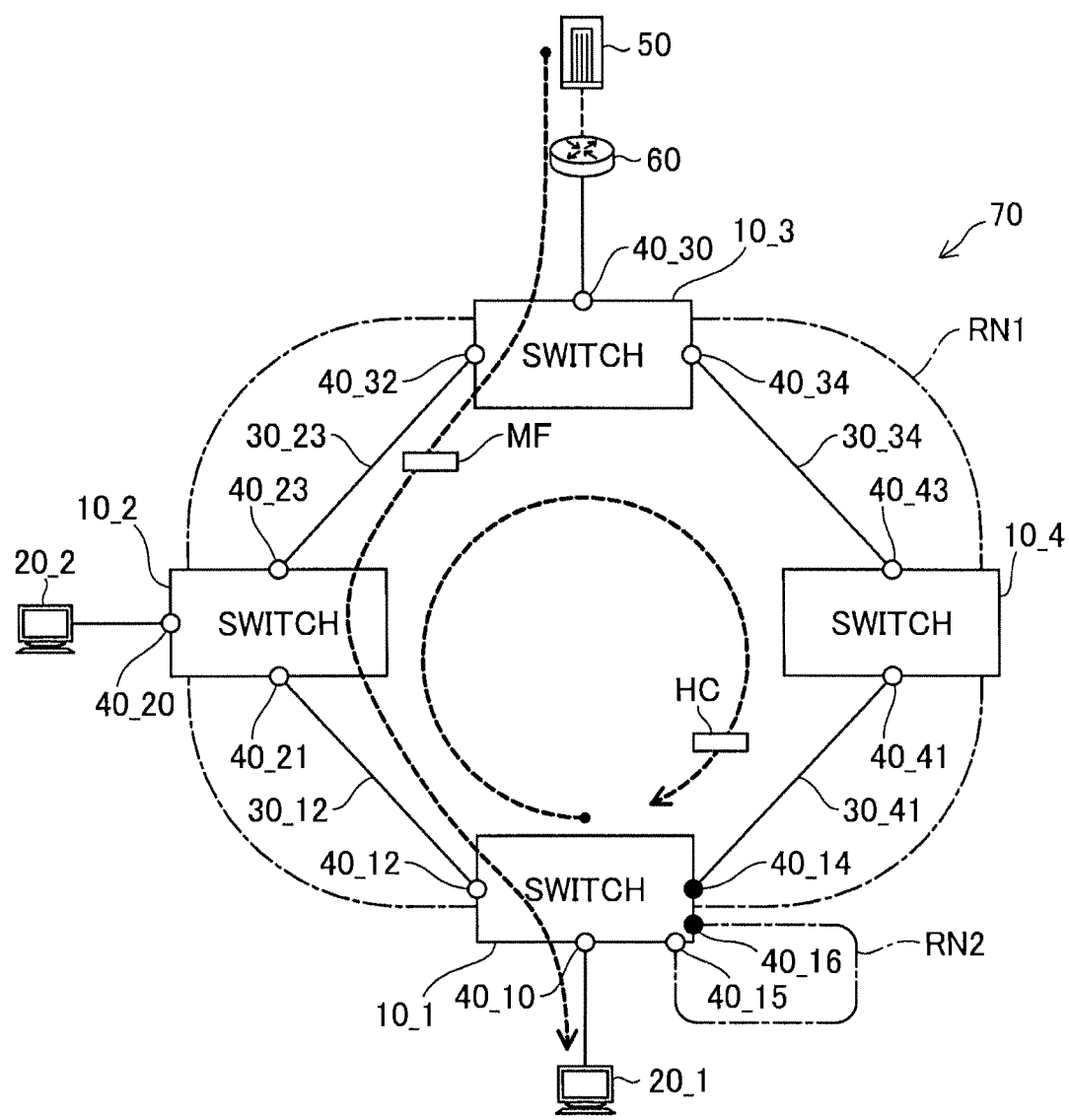
FIG. 1 illustrates the configuration of a network system.

FIG. 1 illustrates the configuration of a network system 70. The network system 70 includes a plurality of switches 10, which are interconnected to construct a layer 2 network. The layer 2 network by the network system 70 is constructed as a computer network conforming to layer 2 as a protocol for a data link layer in an OSI (Open System Interconnection) reference model and is configured to receive a multicast packet sent from a server 50 via a router 60 and relay the received multicast packet to terminal devices 20. The numbers of the switches 10, the terminal devices 20, the server 50 and the router 60 shown in FIG. 1 are only illustrative and may arbitrarily be increased or decreased according to other embodiments.

In the description of the embodiment, the numerical symbol "10" is used to generally represent the switch included in the network system 70, and an individual suffix is added to the symbol "10" to represent an individual switch. In the illustrated example of FIG. 1, the network system 70 has four switches 10, which are differentiated by individual suffixed symbols "10_1", "10_2", "10_3" and "10_4".

In the description of the embodiment, the numeral symbol "20" is used to generally represent the terminal device connected with the network system 70, and an individual suffix is added to the symbol "20" to represent an individual terminal device. In the illustrated example of FIG. 1, a suffixed symbol 20_1 is used to represent the terminal device 20 connected with the switch 10_1, and a suffixed symbol 20_2 is used to represent the terminal device 20 connected with the switch 10_2.

The switch 10 of the network system 70 is a network relay device (layer 2 switch) configured to relay data in the layer 2 network by the layer 2-conforming transfer method. Each of the switches 10 includes a plurality of communication ports 40 configured to send and receive data frames in conformity with the layer 2 and establishes links with other nodes (e.g., other switches 10, terminal device 20 and router 60). The number of the communication ports 40 included in each switch 10 shown in FIG. 1 is only illustrative and may arbitrarily be increased or decreased according to other embodiments.

In the description of the embodiment, the numeral symbol "40" is used to generally represent the communication port included in each of the switches 10, and an individual suffix is added to the symbol "40" to represent an individual communication port. In the illustrated example of FIG. 1, the switch 10_1 has five communication ports 40_10, 40_12, 40_14, 40_15 and 40_16, where the communication port 40_10 is connected with the terminal device 20_1. The switch 10_2 has three communication ports 40_20, 40_21 and 40_23, where the communication port 40_20 is connected with the terminal device 20_2. The switch 10_3 has three communication ports 40_30, 40_32 and 40_34, where the communication port 40_30 is connected with the router 60. The switch 10_4 has two communication ports 40_41 and 40_43.

In the description of the embodiment, the numeral symbol "30" is used to generally represent the link established between two switches 10, and an individual suffix is added to the symbol "30" to represent an individual link. In the illustrated example of FIG. 1, a link 30_12 is established between the communication port 40_12 of the switch 10_1 and the communication port 40_21 of the switch 10_2. A link 30_23 is established between the communication port 40_23 of the switch 10_2 and the communication port 40_32 of the switch 10_3. A link 30_34 is established between the communication port 40_34 of the switch 10_3 and the communication port 40_43 of the switch 10_4. A link 30_41 is established between the communication port 40_41 of the switch 10_4 and the communication port 40_14 of the switch 10_1.

The layer 2 network by the network system 70 includes ring networks RN, each constructed as a redundancy network by interconnecting the plurality of switches 10 in a ring form for the purpose of redundancy of the communication path. The ring network RN is established by the switches 10 operating in conformity with a ring protocol.

In the description of the embodiment, the symbol "RN" is used to generally represent the ring network, and an individual suffix is added to the symbol "RN" to represent an individual ring network. In the illustrated example of FIG. 1, the ring network RN1 is constructed by sequentially connecting the switch 10_1, the switch 10_2, the switch 10_3 and the switch 10_4 in this order in a ring form. The ring network RN2 is constructed by sequentially connecting the switch 10_1 and other switches (not shown in FIG. 1). In the illustrated example of FIG. 1, the switch 10_1 serves as a master node to manage the ring networks RN1 and RN2, and all the other switches 10 serve as transit nodes to transfer data frames under management of the master node.

The switch 10_1 acting as the master node of the ring network RN1 sends a health-check frame HC as a data frame for checking the status of the ring network RN1 from one communication port 40_12 of its two communication ports 40 belonging to the ring network RN1 to the ring network RN1, and receives the health-check frame HC passing around the ring network RN1 at the other communication port 40_14. The switch 10_1 as the mater node determines that the ring network RN1 is healthy when the health-check frame HC is received within a preset time period, while determining that the ring network RN1 has a communication failure when the health-check frame HC is not received within the preset time period.

When the ring network RN1 is determined to be healthy, the switch 10_1 serving as the master node sets the communication port 40_12 of sending the health-check frame HC in the master node to "forwarding" state that allows sending and receiving data frames, while setting the communication port 40_14 of receiving the health-check frame HC in the master node to "blocking" state that allows only receiving the health-check frame HC but forbids sending and receiving any data frames. Such setting prevents looping of data frames in the ring network RN1. In the illustration of FIG. 1, open circles represent the communication ports 40 of the respective switches 10 in the forwarding state, and closed circles represent the communication ports 40 in the blocking state.

When the ring network RN1 is determined to have a communication failure, on the other hand, the switch 10_1 serving as the master node changes the status of the communication port 40_14 from the blocking state to the forwarding state, in order to recover communication in the ring network RN1. Irrespective of whether the ring network RN1 is healthy or not, in each of the switches 10_2, 10_3 and 10_4 serving as the transit nodes, both the two communication ports 40 belonging to the ring network RN1 are set to the forwarding state.

The switch 10_1 serving as the mater node manages the ring network RN2 in a similar way to that of the ring network RN1. In the illustrated example of FIG. 1, when the ring network RN2 is determined to be healthy, the switch 10_1 sets the communication port 40_15 to the forwarding state and the communication port 40_16 to the blocking state.

In the network system 70, the switch 10 performs IGMP/MLD snooping to transfer a multicast frame MF including a multicast packet based on the result of IGMP/MLD snooping. Exemplary transfer of the multicast frame MF is illustrated in FIG. 1. In the illustrated example of FIG. 1, the network system 70 transfers the multicast frame MF received at the communication port 40_30 of the switch 10_3 sequentially to the switch 10_3, the switch 10_2 and the switch 10_1 in this order on the ring network RN1 and sends out the multicast frame MF from the communication port 40_10 of the switch 10_1 to the terminal device 20_1 as the host of multicast.

Figure 2:
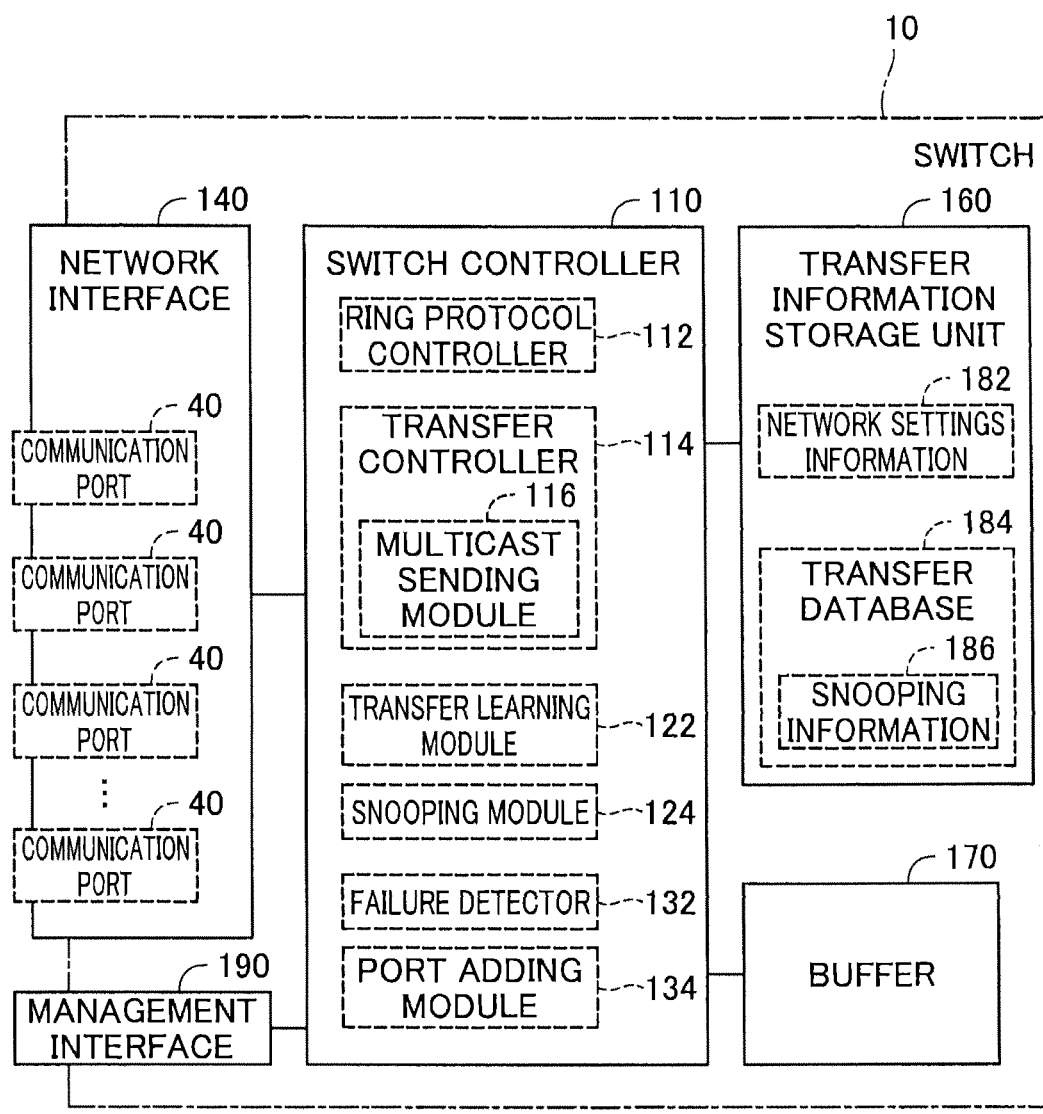
FIG. 2 illustrates the detailed structure of a switch.

FIG. 2 illustrates the details of the switch 10. The switch 10 includes a switch controller 110, a network interface 140, a transfer information storage unit 160, a buffer 170 and a management interface 190.

The network interface 140 of the switch 10 has the plurality of communication ports 40 and sends and receives data frames to and from the other nodes connected with the communication ports 40 as described above. The management interface 190 of the switch 10 is a device serving to send and receive information to and from the administrator of the network system 70 and may be, for example, an operation panel, a memory card slot or a communication port. The buffer 170 of the switch 10 is a storage device configured to temporarily store a data frame to be processed by the switch controller 110.

The transfer information storage unit 160 of the switch 10 stores network settings information 182 and a transfer database 184 as variety of data to be processed by the switch controller 110.

The network settings information 182 stored in the transfer information storage unit 160 represents settings information defining the operation mode of the switch 10 to enable the network system 70 and is set by the administrator of the network system 70. The details of the network settings information 182 will be described later.

The transfer database 184 stored in the transfer information storage unit 160 includes transfer information correlating a destination MAC address of a data frame to the communication port 40 serving as a transfer port, from which the data frame is to be transferred, and is created by learning based on the data frame received at the communication port 40 or by IGMP/MLD snooping. The transfer database 184 includes snooping information 186 correlating a destination MAC address of a multicast frame MF to the communication port 40 serving as a multicast transfer port, from which the multicast frame MF is to be transferred, as the result of IGMP/MLD snooping. The details of the snooping information 186 will be described later.

The switch controller 110 of the switch 10 is electrically connected with the respective parts of the switch 10 and performs various series of control processes to transfer data frames. The switch controller 110 includes a ring protocol controller 112, a transfer controller 114, a transfer learning module 122, a snooping module 124, a failure detector 132, and a port adding module 134.

According to this embodiment, the ASIC (Application Specific Integrated Circuit) operating according to its physical circuit structure implements the functions of the respective elements of the switch controller 110. According to another embodiment, however, at least part of these functions may be implemented by the CPU (Central Processing Unit) operating according to a computer program.

The ring protocol controller 112 of the switch controller 110 performs a series of processing according to the ring protocol, based on the settings information given as the network settings information 182 stored in the transfer information storage unit 160, so as to establish the ring network RN.

In the switch 10 set as the master node of the ring network RN, the ring protocol controller 112 of the switch controller 110 checks the communication status of the ring network RN using the health-check frame HC. In response to detection of a communication failure on the ring network RN, the ring protocol controller 112 sets both the two communication ports 40 of the master-node switch 10 belonging to the ring network RN to the forwarding state, and sends an FDB (Forwarding Database) flash frame from these communication ports 40 in the forwarding state to the respective switches 10 serving as the transit nodes of the ring network RN. The FDB flash frame represents information instructing each switch 10 to reconstruct the transfer database 184 responding to a change in network configuration of the ring network RN.

The transfer controller 114 of the switch controller 110 performs a series of processing to transfer a data frame, based on the transfer information included in the transfer database 184 stored in the transfer information storage unit 160. The transfer controller 114 includes a multicast sending module 116 configured to process the multicast frame MF, which is one of data frames. The multicast sending module 116 sends the multicast frame MF from the communication port 40 serving as the multicast transfer port, based on the snooping information 186 stored in the transfer information storage unit 160.

The transfer learning module 122 of the switch controller 110 refers to a data frame received at the communication port 40 to learn the transfer destination of the data frame and registers the transfer information as the result of learning into the transfer database 184.

The snooping module 124 of the switch controller 110 learns the transfer destination of a multicast frame based on the result of IGMP/MLD snooping and registers the snooping information 186 as the result of learning into the transfer database 184.

The failure detector 132 of the switch controller 110 detects a communication failure in the layer 2 network by the network system 70. For example, in the switch 10 set as the master node of the ring network RN, the failure detector 132 may detect a communication failure in the layer 2 network by detecting a communication failure on the ring network RN by the ring protocol controller 112 using the health-check frame HC. In the switch 10 set as the transit node of the ring network RN, on the other hand, the failure detector 132 may detect a communication failure in the layer 2 network by receiving the FDB flash frame. In the switch 10 having the communication port 40 connected to the link with a communication failure, the failure detector 132 may detect a communication failure in the layer 2 network, based on the timeout of the communication protocol, which indicates no notification of delivery confirmation by the transfer destination even after elapse of a preset time period since transmission of a data frame.

In response to detection of a communication failure by the failure detector 132, the port adding module 134 of the switch controller 110 adds the communication port 40 belonging to the ring network RN to the settings of the multicast transfer port for the snooping information 186 registered in the transfer database 184, so as to update the snooping information 186 included in the transfer database 184 stored in the transfer information storage unit 160. The details of updating the snooping information 186 will be described later.

FIGS. 3 to 6 illustrate the details of the network settings information 182. In the description of the embodiment, the numerical symbol "182" is used to generally represent the network settings information, and an individual suffix corresponding to a specific switch 10 is added to the symbol "182" to represent the network settings information of the specific switch 10.

FIG. 3 illustrates network settings information 182_1 on the switch 10_1. The network settings information 182_1 includes information regarding VLANs (Virtual Local Area Networks) and the ring network as the settings information defining the operation mode of the switch 10_1.

For example, the network settings information 182_1 includes the settings information on VLANs indicating that the data frame of VLAN1 as one of VLANs is processed by tag VLAN using the communication ports 40_12 and 40_14. The settings information on VLANs also indicate that the data frame of VLAN2 as one of the VLANs is processed by tag VLAN using the communication ports 40_12 and 40_14 and by port VLAN using the communication port 40_10 and is set as the target of IGMP/MLD snooping. In the illustrated example of FIG. 3, such information is similarly set with respect to the VLANs other than VLAN1 and VLAN2.

The network settings information 182_1 also includes the settings information on the ring network RN indicating that the switch 10_1 serves as the master node of the ring network RN1, that LVAN1 is set to the control VLAN serving to send and receive the health-check frame HC in the ring network RN1, that VLANs 2 to 10 are set to the object VLANs as control objects of the ring network RN1 and that the communication ports 40_12 and 40_14 are set to ring ports belonging to the ring network RN1. Such information is similarly set with respect to the ring network RN2.

FIG. 4 illustrates network settings information 182_2 on the switch 10_2. The network settings information 182_2 includes information regarding VLANs and the ring network as the settings information defining the operation mode of the switch 10_2.

For example, the network settings information 182_2 includes the settings information on VLANs indicating that the data frame of VLAN1 is processed by tag VLAN using the communication ports 40_21 and 40_23. The settings information on VLANs also indicate that the data frame of VLAN2 is processed by tag VLAN using the communication ports 40_21 and 40_23 and by port VLAN using the communication port 40_20 and is set as the target of IGMP/MLD snooping. In the illustrated example of FIG. 4, such information is similarly set with respect to the VLANs other than VLAN1 and VLAN2.

The network settings information 182_2 also includes the settings information on the ring network RN indicating that the switch 10_2 serves as the transit node of the ring network RN1, that LVAN1 is set to the control VLAN serving to send and receive the health-check frame HC in the ring network RN1, that VLANs 2 to 10 are set to the object VLANs as control objects of the ring network RN1 and that the communication ports 40_21 and 40_23 are set to ring ports belonging to the ring network RN1.

Figure 5:
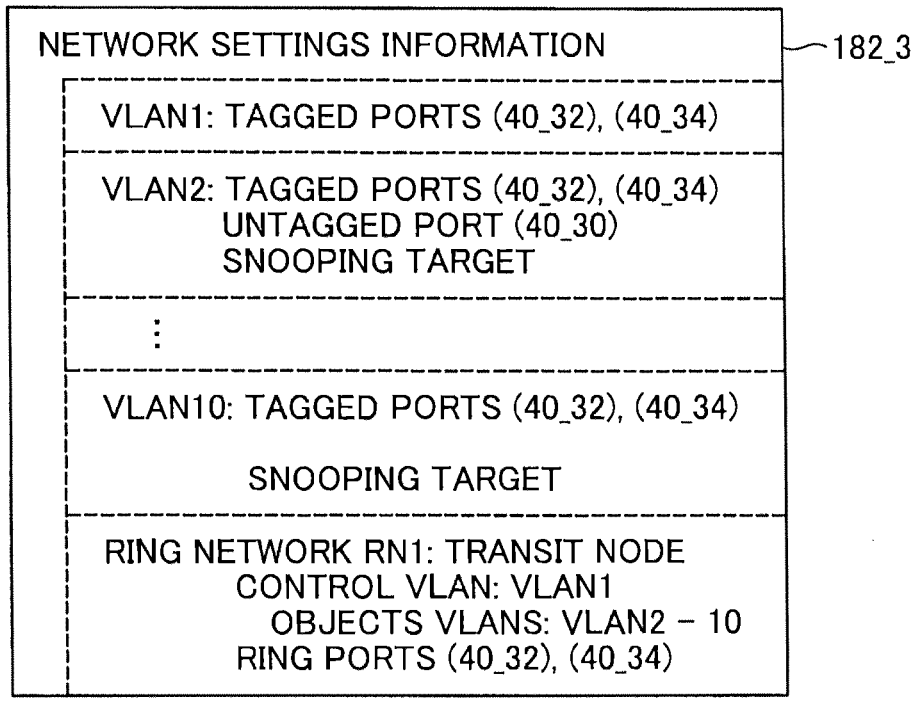
FIG. 5 illustrates the details of network settings information.
Figure 6:
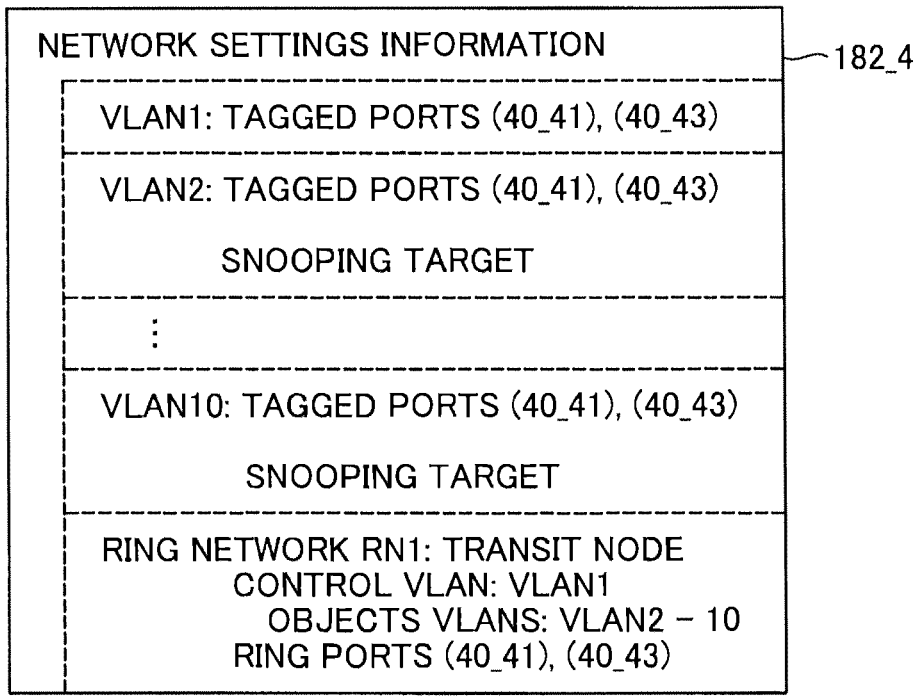
FIG. 6 illustrates the details of network settings information.

FIG. 5 illustrates network settings information 182_3 on the switch 10_3. FIG. 6 illustrates network settings information 182_4 on the switch 10_4. The network settings information 182_3 and the network settings information 182_4 include settings information on VLANs and settings information on the ring network RN, like the network settings information 182_2 of FIG. 4 described above.

FIGS. 7A to 7D illustrate the details of the snooping information 186. In the description of the embodiment, the numerical symbol "186" is used to generally represent the snooping information, and an individual suffix corresponding to a specific switch 10 is added to the symbol "186" to represent the snooping information of the specific switch 10. FIG. 7A illustrates snooping information 186_1 on the switch 10_1, FIG. 7B illustrates snooping information 186_2 on the switch 10_2, FIG. 7C illustrates snooping information 186_3 on the switch 10_3 and FIG. 7D illustrates snooping information 186_4 on the switch 10_4.

Each of the snooping information 186_1 to 186_4 shown in FIGS. 7A to 7D is transfer information used for transfer of the multicast frame MF described above with reference to FIG. 1. A destination MAC address "MAC_MG1" shown in FIGS. 7A to 7D represents a multicast group address of the multicast frame MF.

The snooping information 186_1 of FIG. 7A indicates that a data frame with the destination MAC address "MAC_MG1" of VLAN2 among the data frames received at the switch 10_1 is to be sent from the communication port 40_10 of the switch 10_1.

The snooping information 186_2 of FIG. 7B indicates that a data frame with the destination MAC address "MAC_MG1" of VLAN2 among the data frames received at the switch 10_2 is to be sent from the communication port 40_21 of the switch 10_2.

The snooping information 186_3 of FIG. 7C indicates that a data frame with the destination MAC address "MAC_MG1" of VLAN2 among the data frames received at the switch 10_3 is to be sent from the communication port 40_32 of the switch 10_3.

The snooping information 186_4 of FIG. 7D indicates that a data frame with the destination MAC address "MAC_MG1" of VLAN2 among the data frames received at the switch 10_4 is to be sent from the communication port 40_43 of the switch 10_4.

Figure 8:
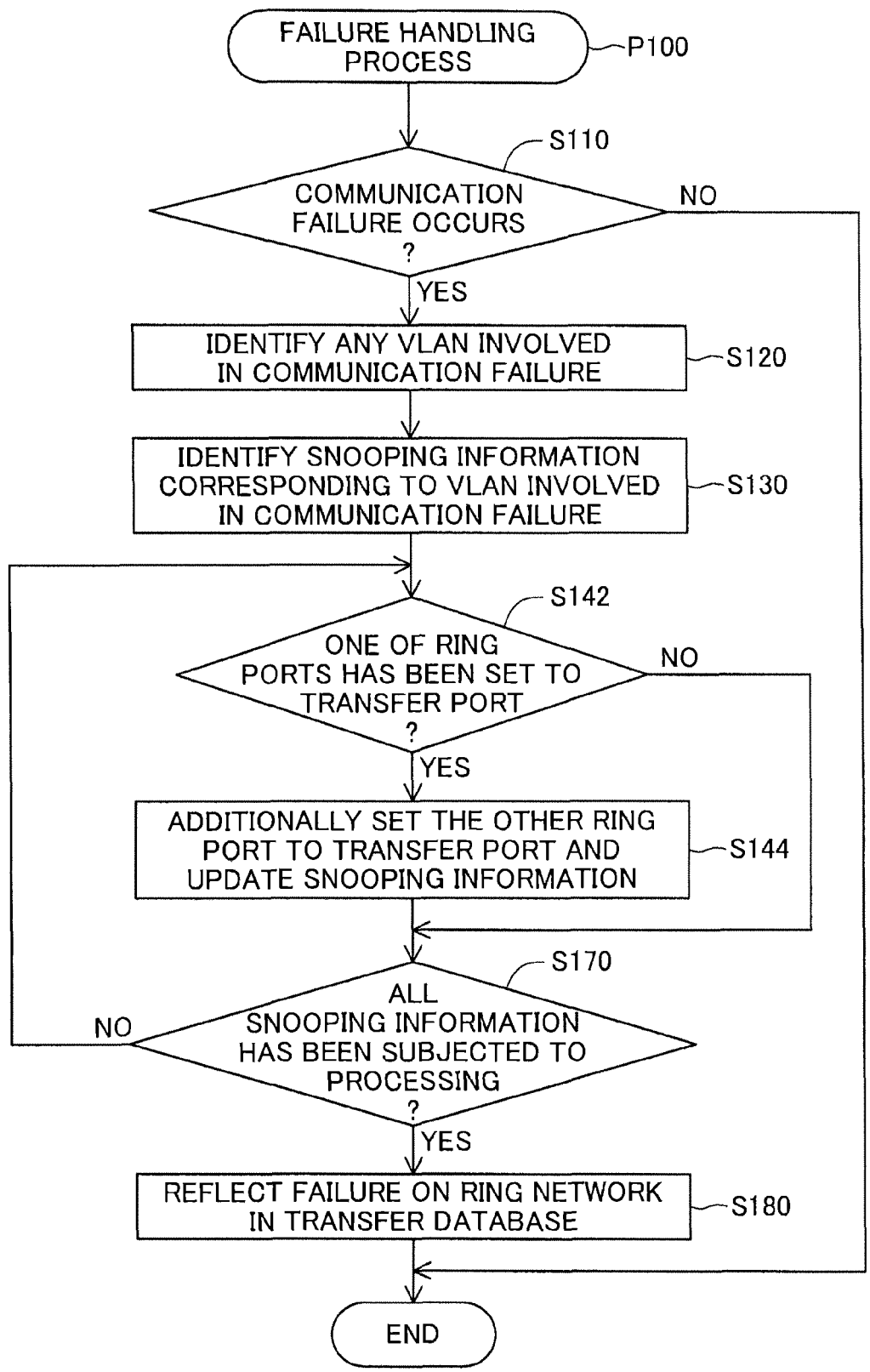
FIG. 8 is a flowchart showing a failure handling process performed by a switch controller of the switch.

FIG. 8 is a flowchart showing a failure handling process P100 performed by the switch controller 110 of the switch 10. The failure handling process P100 takes a corrective action, in order to recover data communication in the event of a communication failure occurring on the ring network RN. According to this embodiment, the switch controller 110 performs the failure handling process P100 at regular intervals.

At the start of the failure handling process P100, the switch controller 110 serving as the failure detector 132 determines whether there is any communication failure on the ring network RN (step S110). According to this embodiment, the switch controller 110 determines whether the ring network RN has a communication failure, based on the results of checking the communication status using the health-check frame HC, receiving the FDB flash frame and the timeout of data frame receiving.

When there is no communication failure on the ring network RN (step S110: No), the switch controller 110 immediately terminates the failure handling process P100.

When there is any communication failure on the ring network RN (step S110: Yes), on the other hand, the switch controller 110 refers to the network settings information 182 stored in the transfer information storage unit 160, so as to identify any VLAN belonging to the ring network RN with the communication failure.

After identifying the VLAN involved in the communication failure (step S120), the switch controller 110 refers to the transfer database 184 stored in the transfer information storage unit 160, so as to identify the snooping information 186 corresponding to the VLAN involved in the communication failure (step S130).

After identifying the snooping information 186 corresponding to the VLAN involved in the communication failure (step S130), the switch controller 110 determines whether one of the two ring ports belonging to the ring network RN with the communication failure has been set to the multicast transfer port for the identified snooping information 186 (step S142).

When one of the ring ports has been set to the multicast transfer port (step S142: Yes), the switch controller 110 serving as the port adding module 134 additionally sets the other ring port belonging to the ring network RN with the communication failure, in addition to one ring port belonging to the ring network RN, to the multicast transfer port for the snooping information 186 identified corresponding to the VLAN involved in the communication failure, so as to update the snooping information 186 stored in the transfer information storage unit 160 (step S144).

When both the ring ports belonging to the ring network RN with the communication failure have been set to the multicast transfer port or when a terminal port connected with the terminal device 20 among the communication ports 40 of the switch 10 has been set to the multicast transfer port (step S142: No), the switch controller 110 does not update the snooping information 186 identified corresponding to the VLAN involved in the communication failure.

When all the snooping information 186 identified corresponding to the VLAN involved in the communication failure (step S130) has been subjected to the processing of steps S142 and S144 (step S170: Yes), the switch controller 110 reflects the communication failure occurring on the ring network RN, in the transfer database 184 (step S180). More specifically, the switch controller 110 deletes the communication port 40 connected to the link 30 with the communication failure from the settings of the multicast transfer port for the snooping information 186 registered in the transfer database 184, so as to update the snooping information 186 stored in the transfer information storage unit 160. The switch controller 110 also deletes the transfer information other than the snooping information 186, which is affected by the change in network configuration of the ring network RN, from the transfer database 184.

After reflecting the communication failure on the ring network RN, in the transfer database 184 (step S180), the switch controller 110 terminates the failure handling process P100.

As a concrete example of the failure handling process P100, it is assumed that a communication failure occurs on the link 30_23 connecting between the switch 10_2 and the switch 10_3 in the status of the network system 70 shown in FIG. 1.

When a communication failure occurs on the link 30_23, the switch controllers 110 of the respective switches 10_1 to 10_4 identify VLANs 2 to 10 as the VLAN belonging to the ring network RN1 with the communication failure (step S120). The switch controllers 110 of the respective switches 10_1 to 10_4 then identify the snooping information 186_1 to 186_4 illustrated in FIGS. 7A to 7D, as the snooping information 186 corresponding to VLAN2 identified as the VLAN involved in the communication failure (step S130). The switch controllers 110 of the respective switches 10_1 to 10_4 subsequently update the snooping information 186_1 to 186_4 illustrated in FIGS. 7A to 7D as appropriate (steps S144 and S180).

FIGS. 9A to 9D illustrate the details of the snooping information 186_1 to 186_4 after the failure handling process P100. FIG. 9A illustrates the snooping information 186_1 on the switch 10_1, FIG. 9B illustrates snooping information 186_2 on the switch 10_2, FIG. 9C illustrates the snooping information 186_3 on the switch 10_3 and FIG. 9D illustrates the snooping information 186_4 on the switch 10_4.

Like the snooping information 186_1 of FIG. 7A, the snooping information 186_1 of FIG. 9A indicates that a data frame with the destination MAC address "MAC_MG1" of VLAN2 among the data frames received at the switch 10_1 is to be sent from the communication port 40_10 of the switch 10_1, due to the following reasons. The communication port 40_10 set to the multicast transfer port for the snooping information 186_1 of FIG. 7A is the terminal port connected with the terminal device 20_1, so that the switch controller 110 of the switch 10_1 does not update the snooping information 186_1 (step S142: No) in the failure handling process P100.

Like the snooping information 186_2 of FIG. 7B, the snooping information 186_2 of FIG. 9B indicates that a data frame with the destination MAC address "MAC_MG1" of VLAN2 among the data frames received at the switch 10_2 is to be sent from the communication port 40_21 of the switch 10_2, due to the following reasons. The communication port 40_21 set to the multicast transfer port for the snooping information 186_2 of FIG. 7B is one of the ring ports belonging to the ring network RN1 with the communication failure, so that the switch controller 110 of the switch 10_2 adds the communication port 40_23 as the other ring port to the settings of the multicast transfer port for the snooping information 186_2 (step S142: Yes, step S144), but subsequently deletes the communication port 40_23 connected to the link 30_23 with the communication failure from the settings of the multicast transfer port for the snooping information 186_2 (step S180) in the failure handling process P100.

Unlike the snooping information 186_3 of FIG. 7C, the snooping information 186_3 of FIG. 9C indicates that a data frame with the destination MAC address "MAC_MG1" of VLAN2 among the data frames received at the switch 10_3 is to be sent from the connection port 40_34 of the switch 10_3, due to the following reasons. The communication port 40_32 set to the multicast transfer port for the snooping information 186_3 of FIG. 7C is one of the ring ports belonging to the ring network RN1 with the communication failure, so that the switch controller 110 of the switch 10_3 adds the communication port 40_34 as the other ring port to the settings of the multicast transfer port for the snooping information 186_3 (step S142: Yes, step S144), and deletes the communication port 40_32 connected to the link 30_23 with the communication failure from the settings of the multicast transfer port for the snooping information 186_3 (step S180) in the failure handling process P100.

Unlike the snooping information 186_4 of FIG. 7D, the snooping information 186_4 of FIG. 9D indicates that a data frame with the destination MAC address "MAC_MG1" of VLAN2 among the data frames received at the switch 10_4 is to be sent from the connection port 40_41 and the connection port 40_43 of the switch 10_4, due to the following reasons. The communication port 40_43 set to the multicast transfer port for the snooping information 186_4 of FIG. 7D is one of the ring ports belonging to the ring network RN1 with the communication failure, so that the switch controller 110 of the switch 10_4 adds the communication port 40_41 as the other ring port to the settings of the multicast transfer port for the snooping information 186_4 (step S142: Yes, step S144) in the failure handling process P100.

Figure 10:
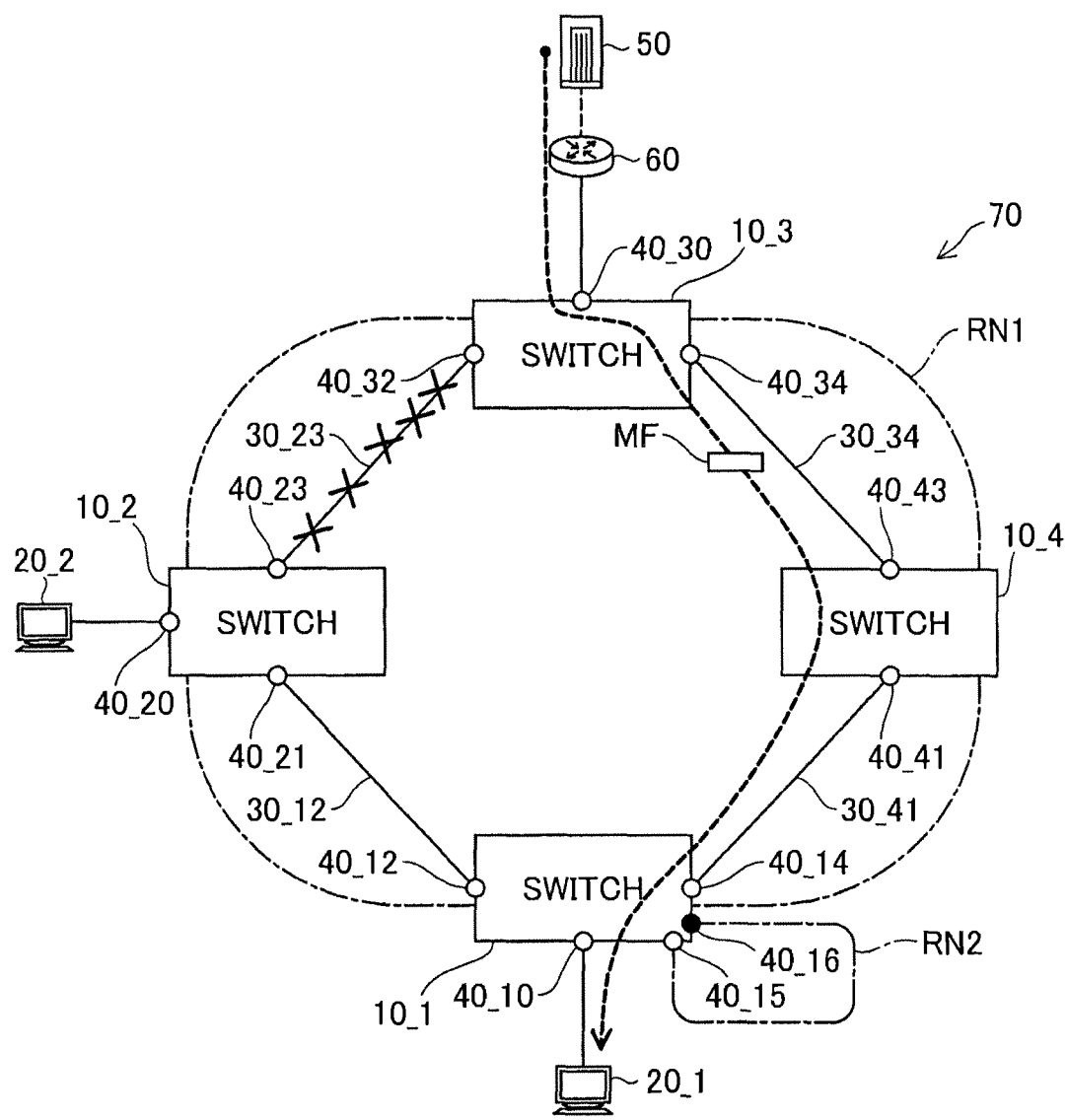
FIG. 10 illustrates an exemplary transfer mode of a multicast frame after the failure handling process.

FIG. 10 illustrates an exemplary transfer mode of the multicast frame MF after the failure handling process P100. The transfer mode of the multicast frame MF illustrated in FIG. 10 is based on the snooping information 186_1 to 186_4 shown in FIGS. 9A to 9D. As illustrated in FIG. 10, in response to the communication failure on the link 30_23 in the ring network RN1, a transfer path that relays the multicast frame MF sequentially through the switch 10_3, the switch 10_4 and the switch 10_1 in this order to the terminal device 20_1 is formed, in place of the transfer path of FIG. 1 that relays the multicast frame MF sequentially through the switch 10_3, the switch 10_2 and the switch 10_1 in this order to the terminal device 20_1.

The switch 10 according to the first embodiment described above ensures relaying the multicast frame MF in the event of a communication failure by simply adding the setting of the multicast transfer port to the existing snooping information 186 without waiting for relearning the snooping information 186. This improves the recovery speed of multicast frame relay in the event of a communication failure in the layer 2 network.

B. Second Embodiment

A network system 70 according to a second embodiment has the similar configurations and operations to those of the network system 70 according to the first embodiment, except the operations of the port adding module 134 of the switch 10.

Figure 11:
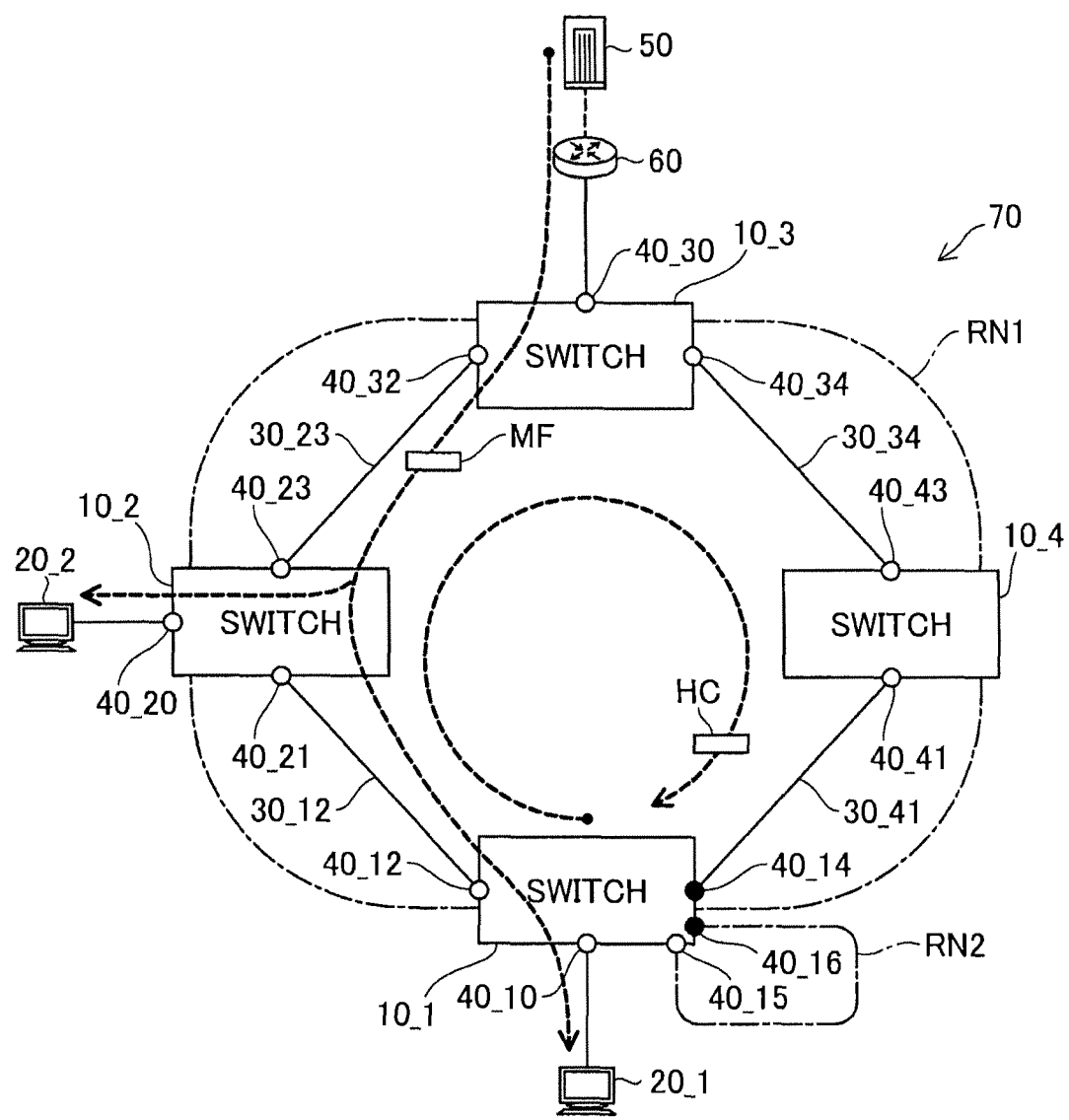
FIG. 11 illustrates exemplary transfer of a multicast frame according to a second embodiment.

FIG. 11 illustrates exemplary transfer of the multicast frame MF according to the second embodiment. In the illustrated example of FIG. 11, the network system 70 transfers the multicast frame MF received at the communication port 40_30 of the switch 10_3 sequentially to the switch 10_3, the switch 10_2 and the switch 10_1 in this order on the ring network RN1 and sends out the multicast frame MF from the communication port 40_10 of the switch 10_1 to the terminal device 20_1, in the same way as that of FIG. 1. Additionally, in the illustrated example of FIG. 11, the network system 70 also sends out the multicast frame MF from the communication port 40_20 of the switch 10_2 to the terminal device 20_2.

FIGS. 12A to 12D illustrate the details of the snooping information 186 according to the second embodiment. FIG. 12A illustrates snooping information 186_1 on the switch 10_1, FIG. 12B illustrates snooping information 186_2 on the switch 10_2, FIG. 12C illustrates snooping information 186_3 on the switch 10_3 and FIG. 12D illustrates snooping information 186_4 on the switch 10_4. The snooping information 186_1 to 186_4 shown in FIGS. 12A to 12D is transfer information used for transfer of the multicast frame MF described above with reference to FIG. 11.

The snooping information 186_2 of FIG. 12B indicates that a data frame with the destination MAC address "MAC_MG1" of VLAN2 among the data frames received at the switch 10_2 is to be sent from the communication port 40_20 and the communication port 40_21 of the switch 10_2. The other snooping information 186_1, 186_3 and 186_4 of FIGS. 12A, 12C and 12D is identical with the snooping information of FIGS. 7A, 7C and 7D.

Figure 13:
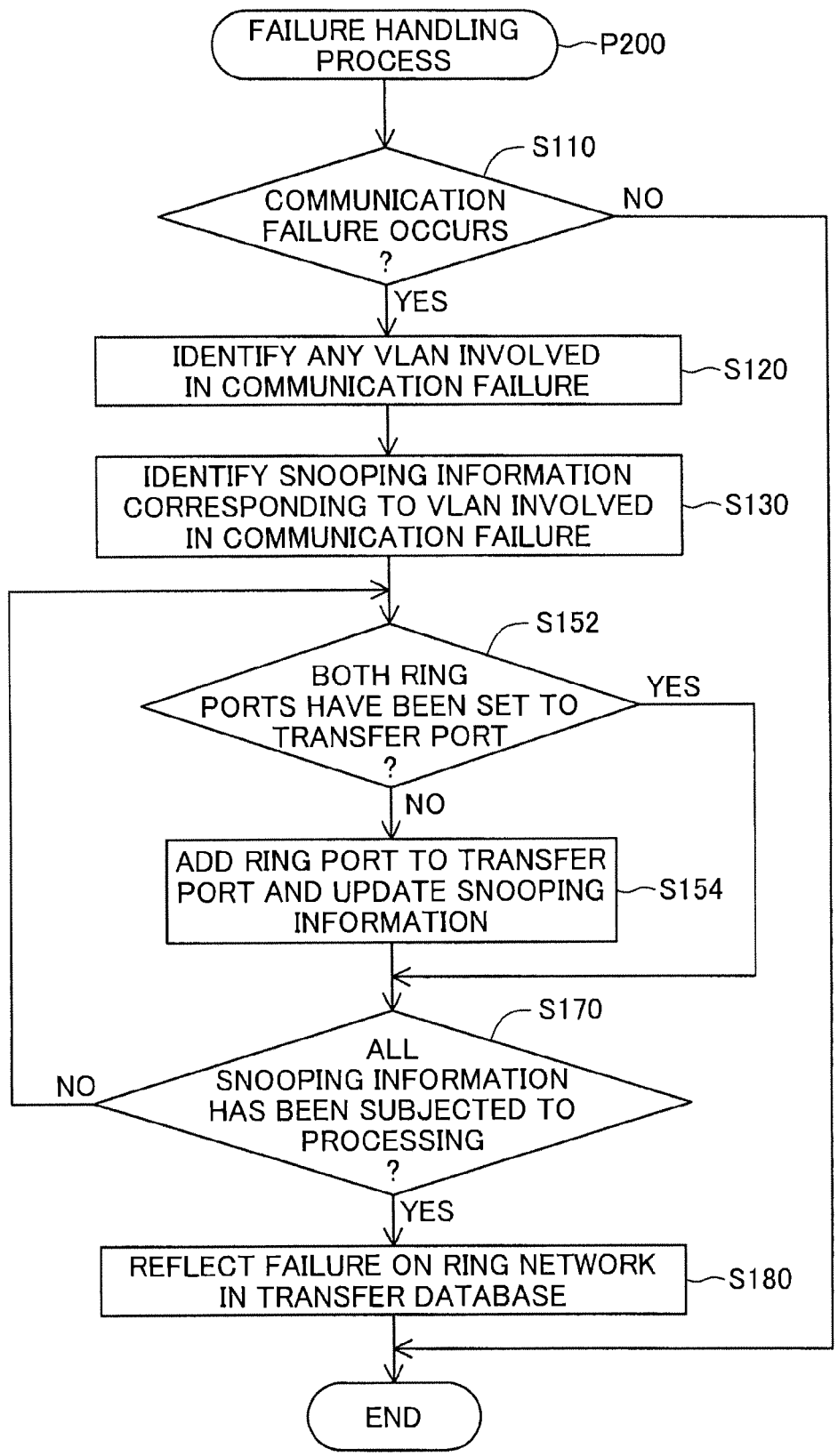
FIG. 13 is a flowchart showing a failure handling process according to the second embodiment.

FIG. 13 is a flowchart showing a failure handling process P200 according to the second embodiment. The failure handling process P200 takes a corrective action, in order to recover data communication in the event of a communication failure occurring on the ring network RN. According to this embodiment, the switch controller 110 performs the failure handling process P200 at regular intervals.

Like the failure handling process P100 of the first embodiment, in the failure handling process P200, when the ring network RN is determined to have a communication failure (step S110: Yes), the switch controller 110 identifies any VLAN involved in the communication failure (step S120) and identifies snooping information 186 corresponding to the VLAN involved in the communication failure (step S130).

After identifying the snooping information 186 corresponding to the VLAN involved in the communication failure (step S130), the switch controller 110 determines whether both the two ring ports belonging to the ring network RN with the communication failure have been set to the multicast transfer port for the identified snooping information 186 (step S152).

When both the ring ports have not been set to the multicast transfer port, i.e., when only one of the ring ports has been set to the multicast transfer port or when the terminal port has been set to the multicast transfer port (step S152: No), the switch controller 110 serving as the port adding module 134 adds one or a plurality of ring ports belonging to the ring network RN with the communication failure to the settings of the multicast transfer port for the snooping information 186 identified corresponding to the VLAN involved in the communication failure, so as to update the snooping information 186 stored in the transfer information storage unit 160 (step S154).

When both the ring ports have been set to the multicast transfer port (step S152: Yes), on the other hand, the switch controller 110 does not update the snooping information 186 corresponding to the VLAN involved in the communication failure.

When all the snooping information 186 identified corresponding to the VLAN involved in the communication failure has been subjected to the processing of steps S152 and S154 (step S170: Yes), the switch controller 110 reflects the communication failure occurring on the ring network RN, in the transfer database 184 (step S180), like the failure handling process P100 of the first embodiment. The switch controller 110 then terminates the failure handling process P200.

As a concrete example of the failure handling process P200, it is assumed that a communication failure occurs on the link 30_23 connecting between the switch 10_2 and the switch 10_3 in the status of the network system 70 shown in FIG. 11.

When a communication failure occurs on the link 30_23, the switch controllers 110 of the respective switches 10_1 to 10_4 identify VLANs 2 to 10 as the VLAN belonging to the ring network RN1 with the communication failure (step S120). The switch controllers 110 of the respective switches 10_1 to 10_4 then identify the snooping information 186_1 to 186_4 illustrated in FIGS. 12A to 12D, as the snooping information 186 corresponding to VLAN2 identified as the VLAN involved in the communication failure (step S130). The switch controllers 110 of the respective switches 10_1 to 10_4 subsequently update the snooping information 186_1 to 186_4 illustrated in FIGS. 12A to 12D as appropriate (steps S154 and S180).

FIGS. 14A to 14D illustrate the details of the snooping information 186_1 to 186_4 after the failure handling process P200 according to the second embodiment. FIG. 14A illustrates the snooping information 186_1 on the switch 10_1, FIG. 14B illustrates snooping information 186_2 on the switch 10_2, FIG. 14C illustrates the snooping information 186_3 on the switch 10_3 and FIG. 14D illustrates the snooping information 186_4 on the switch 10_4.

Unlike the snooping information 186_1 of FIG. 12A, the snooping information 186_1 of FIG. 14A indicates that a data frame with the destination MAC address "MAC_MG1" of VLAN2 among the data frames received at the switch 10_1 is to be sent from the communication port 40_10, the communication port 40_12 and the communication port 40_14 of the switch 10_1, due to the following reasons. The switch controller 110 of the switch 10_1 adds the communication port 40_12 and the communication port 40_14 as the ring ports belonging to the ring network RN1 with the communication failure to the settings of the multicast transfer port for the snooping information 186_1 (step S152: No, step S154) in the failure handling process P200.

Like the snooping information 186_2 of FIG. 12B, the snooping information 186_2 of FIG. 14B indicates that a data frame with the destination MAC address "MAC_MG1" of VLAN2 among the data frames received at the switch 10_2 is to be sent from the communication port 40_20 and the communication port 40_21 of the switch 10_2, due to the following reasons. The communication port 40_21 set to the multicast transfer port for the snooping information 186_2 of FIG. 12B is one of the ring ports belonging to the ring network RN1 with the communication failure, so that the switch controller 110 of the switch 10_2 adds the communication port 40_23 as the other ring port to the settings of the multicast transfer port for the snooping information 186_2 (step S152: No, step S154), but subsequently deletes the communication port 40_23 connected to the link 30_23 with the communication failure from the settings of the multicast transfer port for the snooping information 186_2 (step S180) in the failure handling process P200.

Unlike the snooping information 186_3 of FIG. 12C, the snooping information 186_3 of FIG. 14C indicates that a data frame with the destination MAC address "MAC_MG1" of VLAN2 among the data frames received at the switch 10_3 is to be sent from the connection port 40_34 of the switch 10_3, due to the following reasons. The communication port 40_32 set to the multicast transfer port for the snooping information 186_3 of FIG. 12C is one of the ring ports belonging to the ring network RN1 with the communication failure, so that the switch controller 110 of the switch 10_3 adds the communication port 40_34 as the other ring port to the settings of the multicast transfer port for the snooping information 186_3 (step S152: No, step S154), and deletes the communication port 40_32 connected to the link 30_23 with the communication failure from the settings of the multicast transfer port for the snooping information 186_3 (step S180) in the failure handling process P200.

Unlike the snooping information 186_4 of FIG. 12D, the snooping information 186_4 of FIG. 14D indicates that a data frame with the destination MAC address "MAC_MG1" of VLAN2 among the data frames received at the switch 10_4 is to be sent from the connection port 40_41 and the connection port 40_43 of the switch 10_4, due to the following reasons. The communication port 40_43 set to the multicast transfer port for the snooping information 186_4 of FIG. 12D is one of the ring ports belonging to the ring network RN1 with the communication failure, so that the switch controller 110 of the switch 10_4 adds the communication port 40_41 as the other ring port to the settings of the multicast transfer port for the snooping information 186_4 (step S152: No, step S154) in the failure handling process P200.

Figure 15:
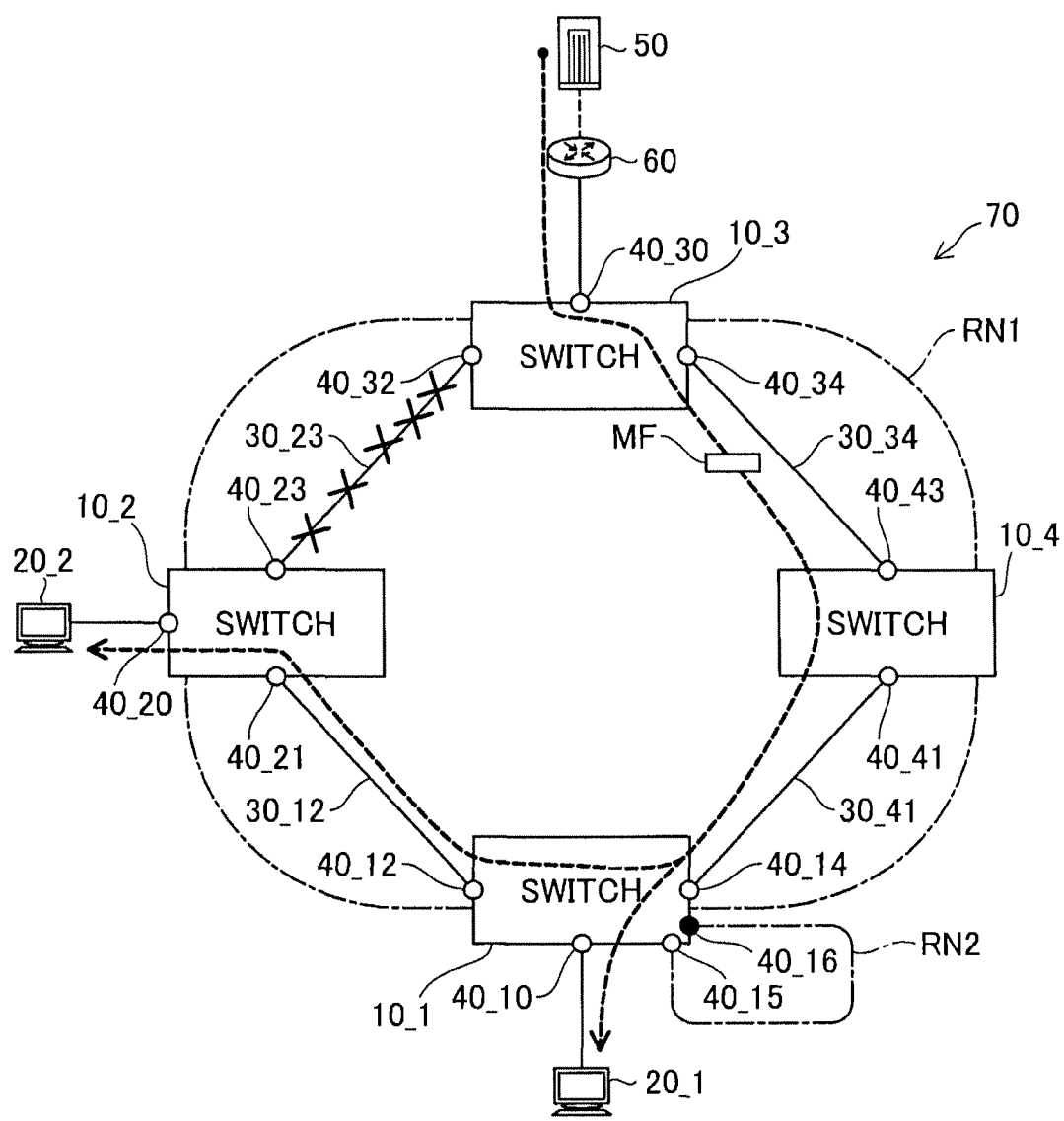
FIG. 15 illustrates an exemplary transfer mode of a multicast frame after the failure handling process according to the second embodiment.

FIG. 15 illustrates an exemplary transfer mode of the multicast frame MF after the failure handling process P200 of the second embodiment. The transfer mode of the multicast frame MF illustrated in FIG. 15 is based on the snooping information 186_1 to 186_4 shown in FIGS. 14A to 14D. As illustrated in FIG. 15, in response to the communication failure on the link 30_23 in the ring network RN1, a transfer path that relays the multicast frame MF sequentially through the switch 10_3, the switch 10_4, the switch 10_1 and the switch 10_2 in this order to the terminal device 20_1 and the terminal device 20_2 is formed, in place of the transfer path of FIG. 11 that relays the multicast frame MF sequentially through the switch 10_3, the switch 10_2 and the switch 10_1 in this order to the terminal device 20_1 and to the terminal device 20_2.

The switch 10 according to the second embodiment described above ensures relaying the multicast frame MF in the event of a communication failure by simply adding the setting of the multicast transfer port to the existing snooping information 186 without waiting for relearning the snooping information 186. This improves the recovery speed of multicast frame relay in the event of a communication failure in the layer 2 network.

When a communication failure occurs on the link 30_23 in the status of FIG. 11, the failure handling process P100 of the first embodiment performed in the switch 10_1 does not form the transfer path to relay the multicast frame MF to the terminal device 20_2. The failure handling process P200 of the second embodiment performed in the switch 10_1, however, forms the transfer path to relay the multicast frame MF from the switch 10_1 through the switch 10_2 to the terminal device 20_2 as shown in FIG. 15.

C. Third Embodiment

A network system 70 according to a third embodiment has the similar configurations and operations to those of the network system 70 according to the second embodiment, except that the switch 10 sends a multicast leaving message LM.

Figure 16:
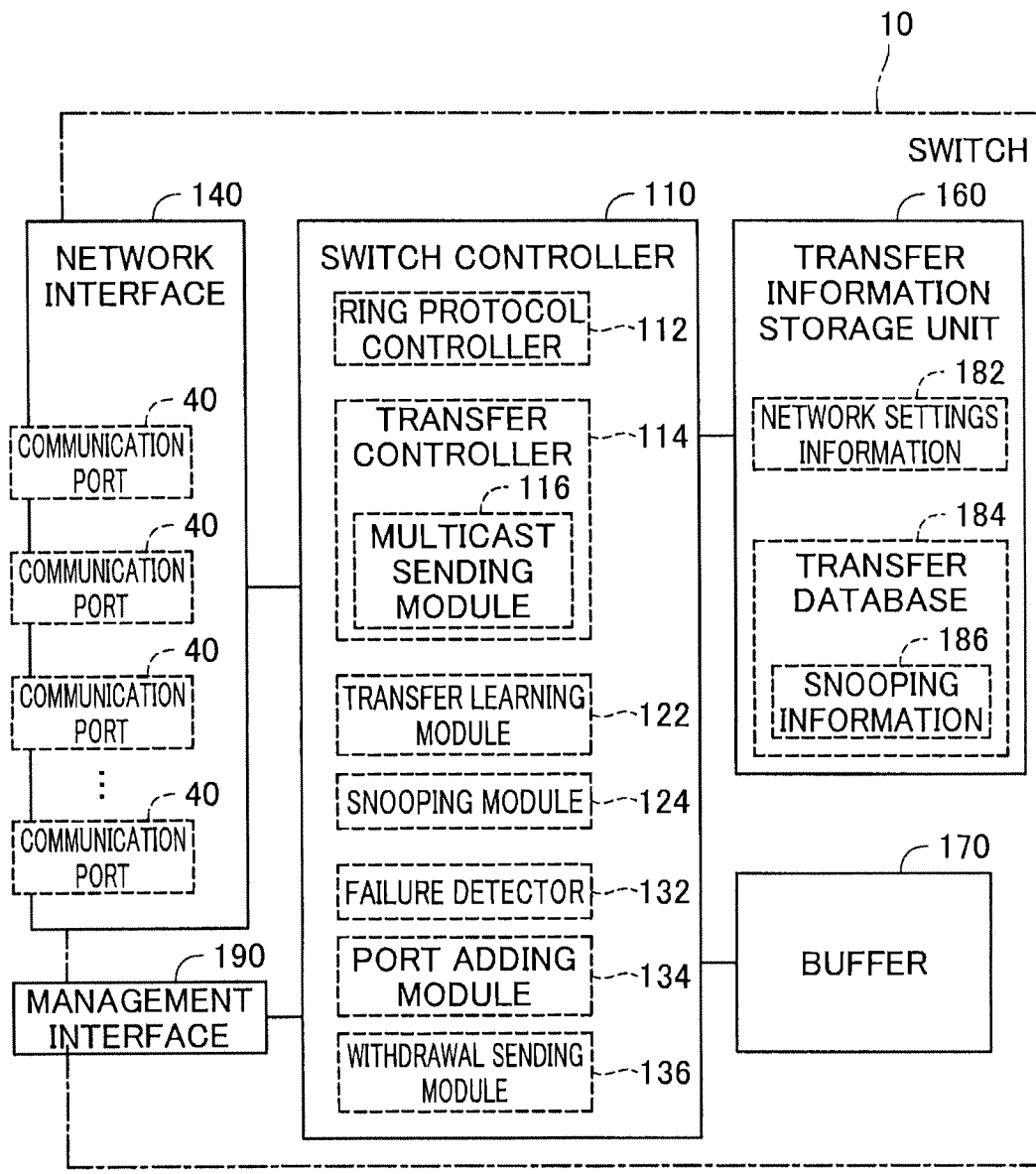
FIG. 16 illustrates the detailed structure of a switch according to a third embodiment.

FIG. 16 illustrates the detailed structure of the switch 10 according to the third embodiment. The switch 10 of the third embodiment has the similar structure to those of the first embodiment and the second embodiment, except that the switch controller 110 has a withdrawal sending module 136. When discarding the multicast frame MF, the withdrawal sending module 136 of the switch controller 110 sends a multicast leaving message LM to notify the source of the multicast frame MF of withdrawal from the multicast group.

Figure 17:
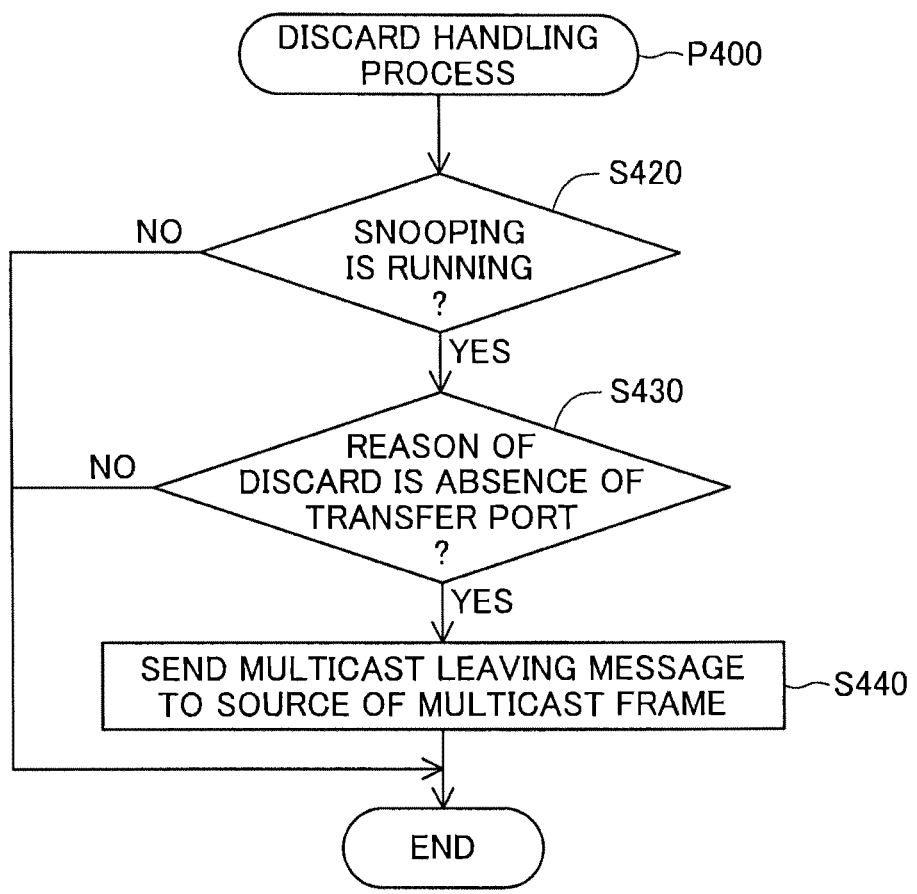
FIG. 17 is a flowchart showing a discard handling process performed by a switch controller of the switch.

FIG. 17 is a flowchart showing a discard handling process P400 performed by the switch controller 110 of the switch 10. The discard handling process P400 responds to discard of the multicast frame MF. According to this embodiment, the switch controller 110 starts the discard handling process P400 when the multicast frame MF received at the communication port 40 is discarded without being transferred to any other node.

At the start of the discard handling process P400, the switch controller 110 first determines whether IGMP/MLD snooping is currently running (step S420). When IGMP/MLP snooping is currently running (step S420: Yes), the switch controller 110 subsequently determines whether the reason of discarding the multicast frame MF is the absence of the multicast transfer port, i.e., whether the settings of the multicast transfer port for the snooping information 186 include any communication port 40 other than the communication port 40 that has received the multicast frame MF (step S430).

When the reason of discarding the multicast frame MF is the absence of the multicast transfer port (step S430: Yes), the switch controller 110 serving as the withdrawal sending module 136 sends a multicast leaving message LM to the source of the multicast frame MF to be discarded (step S440). The switch controller 110 then terminates the discard handling process P400.

Figure 18:
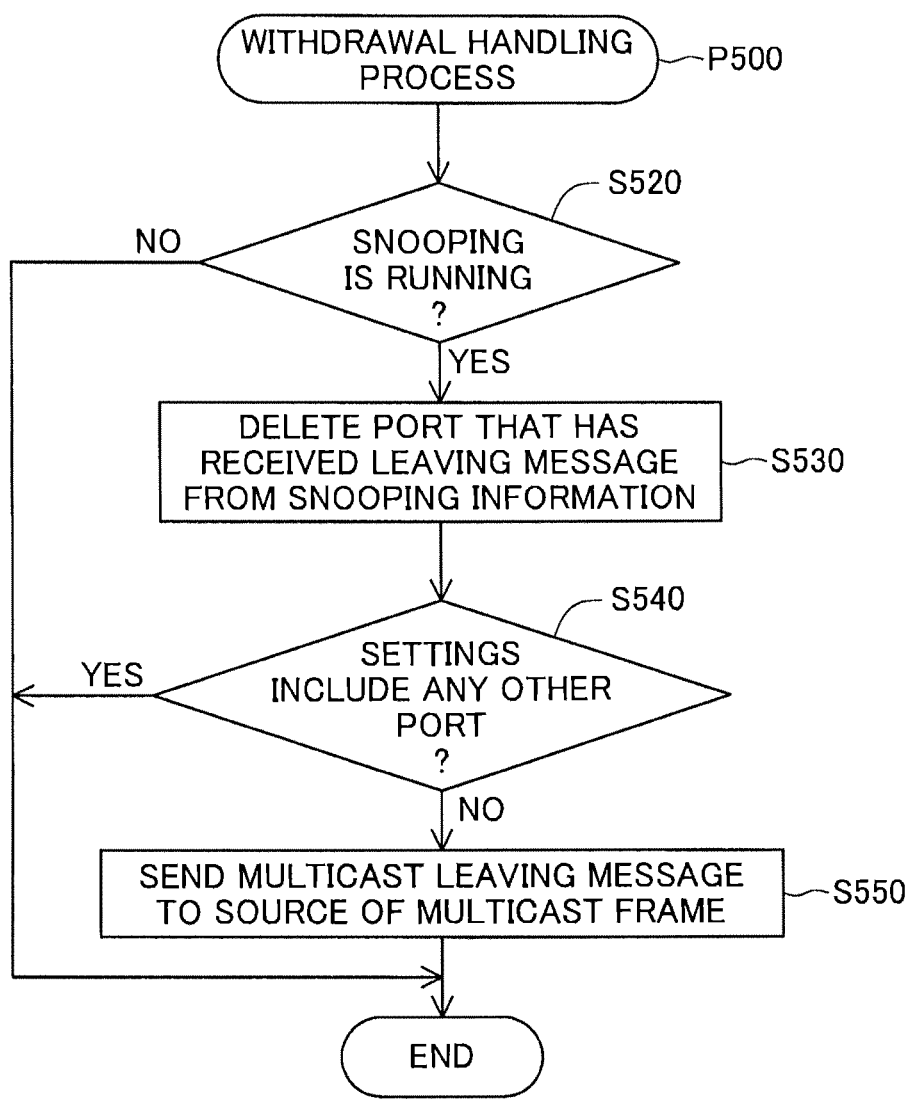
FIG. 18 is a flowchart showing a withdrawal handling process performed by the switch controller of the switch.

FIG. 18 is a flowchart showing a withdrawal handling process P500 performed by the switch controller 110 of the switch 10. The withdrawal handling process P500 responds to reception of the multicast leaving message LM from another switch 10. According to this embodiment, the switch controller 110 starts the withdrawal handling process P500 when receiving the multicast leaving message LM from another switch 10.

At the start of the withdrawal handling process P500, the switch controller 110 first determines whether IGMP/MLD snooping is currently running (step S520). When IGMP/MLP snooping is currently running (step S520: Yes), the switch controller 110 deletes the communication port 40 that has received the multicast leaving message LM from the settings of the multicast transfer port for the snooping information 186, so as to update the snooping information 186 included in the transfer database 184 stored in the transfer information storage unit 160 (step S530).

After updating the snooping information 186 (step S530), when the settings of the multicast transfer port for the snooping information 186 include no communication port 40 other than the communication port 40 that has received the multicast frame MF (step S540: No), the switch controller 110 serving as the withdrawal sending module 136 sends the multicast leaving message LM to the source of the multicast frame MF to be discarded (step S550). The switch controller 110 then terminates the withdrawal handling process P500.

After updating the snooping information 186 (step S530), when the settings of the multicast transfer port for the snooping information 186 include any communication port 40 other than the communication port 40 that has received the multicast frame MF (step S540: Yes), the switch controller 110 immediately terminates the withdrawal handling process P500.

As a concrete example of the discard handling process P400 and the withdrawal handling process P500, it is assumed that a communication failure occurs on the link 30_23 in the status of the network system 70 shown in FIG. 1 and the switch controllers 110 of the respective switches 10_1 to 10_4 perform the failure handling process P200 of the second embodiment.

FIGS. 19A to 19D illustrate the details of the snooping information 186_1 to 186_4 after the failure handling process P200 according to the third embodiment. FIG. 19A illustrates the snooping information 186_1 on the switch 10_1, FIG. 19B illustrates snooping information 186_2 on the switch 10_2, FIG. 19C illustrates the snooping information 186_3 on the switch 10_3 and FIG. 19D illustrates the snooping information 186_4 on the switch 10_4.

Unlike the snooping information 186_1 of FIG. 7A, the snooping information 186_1 of FIG. 19A indicates that a data frame with the destination MAC address "MAC_MG1" of VLAN2 among the data frames received at the switch 10_1 is to be sent from the communication port 40_10, the communication port 40_12 and the communication port 40_14 of the switch 10_1, due to the following reasons. The switch controller 110 of the switch 10_1 adds the communication port 40_12 and the communication port 40_14 as the ring ports belonging to the ring network RN1 with the communication failure to the settings of the multicast transfer port for the snooping information 186_1 (step S152: No, step S154) in the failure handling process P200.

Like the snooping information 186_2 of FIG. 7B, the snooping information 186_2 of FIG. 19B indicates that a data frame with the destination MAC address "MAC_MG1" of VLAN2 among the data frames received at the switch 10_2 is to be sent from the communication port 40_21 of the switch 10_2, due to the following reasons. The communication port 40_21 set to the multicast transfer port for the snooping information 186_2 of FIG. 7B is one of the ring ports belonging to the ring network RN1 with the communication failure, so that the switch controller 110 of the switch 10_2 adds the communication port 40_23 as the other ring port to the settings of the multicast transfer port for the snooping information 186_2 (step S152: No, step S154), but subsequently deletes the communication port 40_23 connected to the link 30_23 with the communication failure from the settings of the multicast transfer port for the snooping information 186_2 (step S180) in the failure handling process P200.

Unlike the snooping information 186_3 of FIG. 7C, the snooping information 186_3 of FIG. 19C indicates that a data frame with the destination MAC address "MAC_MG1" of VLAN2 among the data frames received at the switch 10_3 is to be sent from the connection port 40_34 of the switch 10_3, due to the following reasons. The communication port 40_32 set to the multicast transfer port for the snooping information 186_3 of FIG. 7C is one of the ring ports belonging to the ring network RN1 with the communication failure, so that the switch controller 110 of the switch 10_3 adds the communication port 40_34 as the other ring port to the settings of the multicast transfer port for the snooping information 186_3 (step S152: No, step S154), and deletes the communication port 40_32 connected to the link 30_23 with the communication failure from the settings of the multicast transfer port for the snooping information 186_3 (step S180) in the failure handling process P200.

Unlike the snooping information 186_4 of FIG. 7D, the snooping information 186_4 of FIG. 19D indicates that a data frame with the destination MAC address "MAC_MG1" of VLAN2 among the data frames received at the switch 10_4 is to be sent from the connection port 40_41 and the connection port 40_43 of the switch 10_4, due to the following reasons. The communication port 40_43 set to the multicast transfer port for the snooping information 186_4 of FIG. 7D is one of the ring ports belonging to the ring network RN1 with the communication failure, so that the switch controller 110 of the switch 10_4 adds the communication port 40_41 as the other ring port to the settings of the multicast transfer port for the snooping information 186_4 (step S152: No, step S154) in the failure handling process P200.

Figure 20:
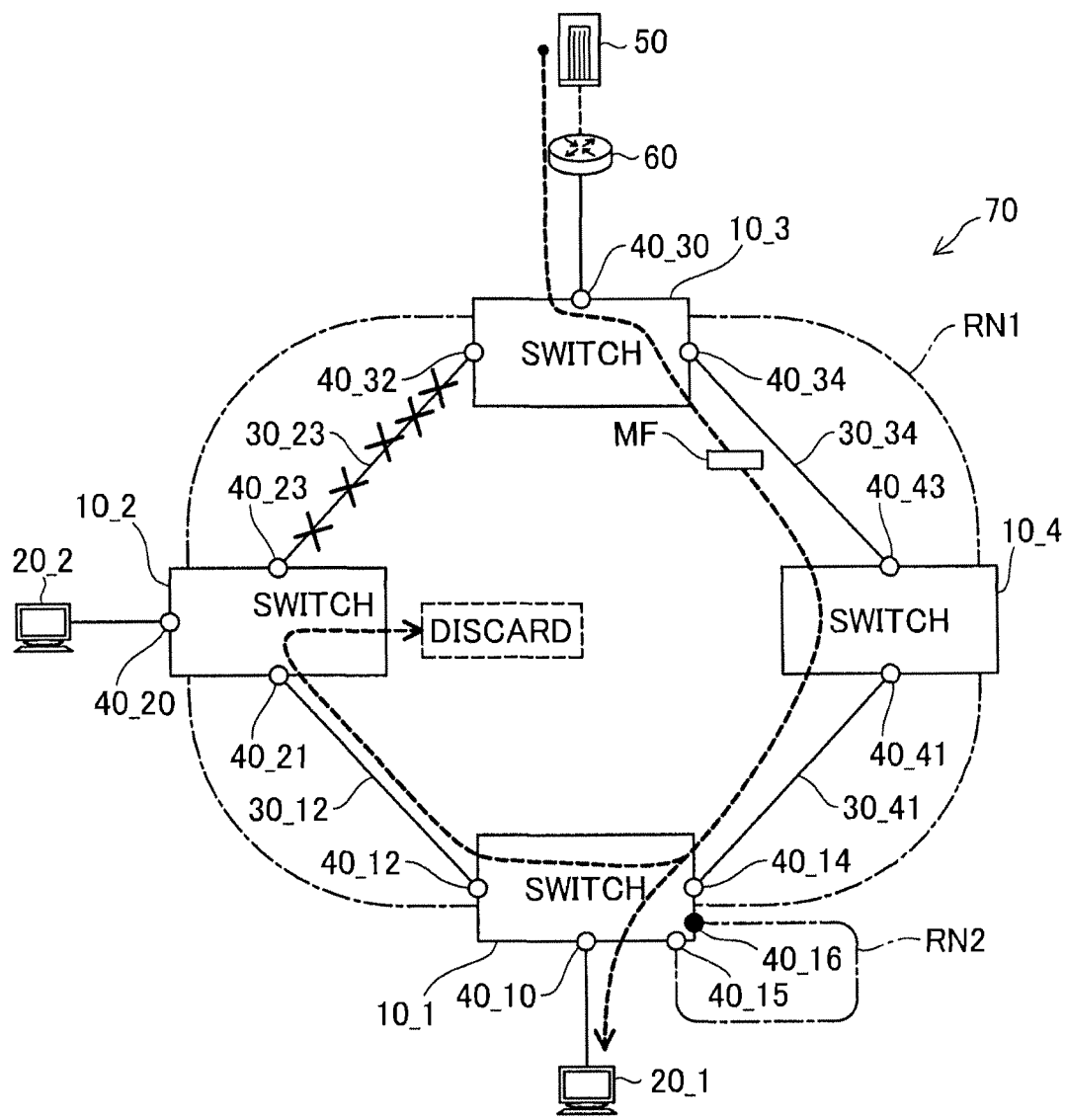
FIG. 20 illustrates an exemplary transfer mode of a multicast frame after the failure handling process according to the third embodiment.

FIG. 20 illustrates an exemplary transfer mode of the multicast frame MF after the failure handling process P200 according to the third embodiment. The transfer mode of the multicast frame MF illustrated in FIG. 20 is based on the snooping information 186_1 to 186_4 shown in FIGS. 19A to 19D. As illustrated in FIG. 20, in response to the communication failure on the link 30_23 in the ring network RN1, a transfer path that relays the multicast frame MF sequentially through the switch 10_3, the switch 10_4 and the switch 10_1 in this order to the terminal device 20_1 is formed, in place of the transfer path of FIG. 1 that relays the multicast frame MF sequentially through the switch 10_3, the switch 10_2 and the switch 10_1 in this order to the terminal device 20_1. The failure handling process P200, however, also forms a useless transfer path branched off from the switch 10_1 to transfer the multicast frame MF to the switch 10_2 and eventually discard the multicast frame MF.

According to the third embodiment, the switch controller 110 of the switch 10_2 discarding the multicast frame MF performs the discard handling process P400 and sends the multicast leaving message LM from the communication port 40_21 that has received the multicast frame MF (step S440).

The switch controller 110 of the switch 10_1 that has received the multicast leaving message LM from the switch 10_2 performs the withdrawal handling process P500 and deletes the communication port 40_12 that has received the multicast leaving message LM from the settings of the multicast transfer port for the snooping information 186_1 of FIG. 19A (step S530).

In the illustrated example of FIG. 19A, the settings of the multicast transfer port for the snooping information 186_1 include a communication port 40_10 other than the communication port 40_14 that has received the multicast frame MF (step S540: Yes), so that the switch controller 110 of the switch 10_1 terminates the withdrawal handling process P500 without sending the multicast leaving message LM from the communication port 40_14. When the settings of the multicast transfer port for the snooping information 186_1 of FIG. 19A does not include the communication port 40_10 (step S540: No), on the other hand, the switch controller 110 of the switch 10_1 sends the multicast leaving message LM from the communication port 40_14.

The third embodiment described above ensures relaying the multicast frame MF in the event of a communication failure by simply adding the setting of the multicast transfer port to the existing snooping information 186 without waiting for relearning the snooping information 186. This improves the recovery speed of multicast frame relay in the event of a communication failure in the layer 2 network.

The discard handling process P400 and the withdrawal handling process P500 advantageously stop the transfer of the multicast frame MF from its source without waiting for timeout of the communication protocol at the source of the multicast frame MR This further improves the recovery speed of multicast frame relay in the event of a communication failure in the layer 2 network. This also advantageously reduces useless transfer of the multicast frame MF accompanied with the occurrence of a communication failure.

D. Other Embodiments

The foregoing has described the invention in detail with reference to the illustrative embodiments. The invention is, however, not limited to the above embodiments, but a multiplicity of variations and modifications may be made to the embodiments without departing from the scope of the invention.

For example, according to the above embodiments, the redundancy network in the network system 70 is the ring network RN conforming to the ring protocol. According to other embodiments, the redundancy network may be a network conforming to a spanning tree protocol or may be a network for redundant communication path conforming to another redundancy protocol.

Each of the switches 10 may be configured to allow switching between the failure handling process P100 of the first embodiment and the failure handling process P200 of the second embodiment. The switching between the failure handling process P100 of the first embodiment and the failure handling process P200 of the second embodiment may be based on the instruction given by the administrator of the network system 70 or may be automatically performed in each of the switches 10 according to the network configuration.

According to the third embodiment, the discard handling process P400 and the withdrawal handling process P500 are applied to the switches 10 forming the ring network RN in the layer 2 network. According to other embodiments, the discard handling process P400 and the withdrawal handling process P500 may be applied to the switches 10 forming a layer 2 network other than the ring network RN.

While the invention has been described with reference to exemplary embodiments thereof, it is to be understood that the invention is not limited to the disclosed embodiments or constructions. On the contrary, the invention is intended to cover various modifications and equivalent embodiments. In addition, while the various elements of the disclosed invention are shown in various combinations and configurations, which are exemplary, other combinations and configurations, including more, less or only a single element, are also within the spirit and scope of the invention.

What is claimed is:

1. A network relay device configured to relay data in a layer 2 network, comprising:
   first and second communication ports configured to belong to the layer 2 network;
   a snooping module configured to generate snooping information, based on snooping with respect to a multicast joining message for notifying of joining to a multicast group, wherein the snooping information correlates the first communication port set to a multicast transfer port, from which a multicast frame is to be transferred, to a destination MAC address of the multicast frame;
   a transfer information storage unit configured to store the snooping information;
   a multicast sending module configured to refer to the snooping information stored in the transfer information storage unit and send a multicast frame received from the layer 2 network, from the correlated multicast transfer port;
   a failure detector configured to detect a communication failure in the layer 2 network; and
   a port adding module configured to, in response to detection of the communication failure by the failure detector, additionally set the second communication port, in addition to the first communication port, to the multicast transfer port, so as to update the snooping information stored in the transfer information storage unit.

2. The network relay device according to claim 1, wherein the layer 2 network includes a redundancy network, and
   at least the second communication port between the first and second communication ports belongs to the redundancy network.

3. The network relay device according to claim 1, further comprising:
   a withdrawal sending module configured to, when the multicast frame received from the layer 2 network is discarded, send a multicast leaving message for notifying of leaving from the multicast group, to a source of the multicast frame.

4. The network relay device according to claim 1,
   wherein the snooping module is further configured to delete, from the snooping information, a communication port has been set to the multicast transfer port, based on snooping with respect to a multicast leaving message for notifying of leaving from the multicast group.

5. The network relay device according to claim 4, further comprising:
   a withdrawal sending module configured to send the multicast leaving message to a source of the multicast frame, when the snooping information includes no communication port is set to the multicast transfer port.

6. The network relay device according to claim 5,
   wherein the withdrawal sending module is further configured to idle, when the snooping information includes any communication port is set to the multicast transfer port.

7. A network relay method of relaying data in a layer 2 network, comprising:
   providing first and second communication ports configured to belong to the layer 2 network in a network relay device;
   generating snooping information, based on snooping by the network relay device with respect to a multicast joining message for notifying of joining to a multicast group, wherein the snooping information correlates the first communication port set to a multicast transfer port, from which a multicast frame is to be transferred, to a destination MAC address of the multicast frame;
   storing the snooping information in a transfer information storage unit provided in the network relay device;
   referring to the snooping information stored in the transfer information storage unit and sending a multicast frame received from the layer 2 network, from the correlated multicast transfer port;
   detecting a communication failure in layer 2 network by the network relay device; and
   in response to detection of the communication failure, additionally setting the second communication port, in addition to the first communication port, to the multicast transfer port, so as to update the snooping information stored in the transfer information storage unit.

8. The network relay method according to claim 7, comprising:
   deleting, from the snooping information, a communication port has been set to the multicast transfer port, based on snooping with respect to a multicast leaving message for notifying of leaving from the multicast group.

9. The network relay method according to claim 8, further comprising:
   sending the multicast leaving message to a source of the multicast frame, when the snooping information includes no communication port is set to the multicast transfer port.

10. The network relay method according to claim 9, further comprising:
    idling, when the snooping information includes any communication port is set to the multicast transfer port.

11. A network relay device configured to relay data in a layer 2 network, comprising:
    a plurality of communication ports configured to belong to the layer 2 network;
    a transfer information storage unit configured to store snooping information, which correlates at least one of the plurality of communication ports set to a multicast transfer port, from which the multicast frame is to be transferred, to a destination MAC address of a multicast frame, the snooping information generated based on snooping with respect to a multicast joining message for notifying of joining to a multicast group;
    a multicast sending module configured to refer to the snooping information stored in the transfer information storage unit and send the multicast frame received from the layer 2 network, from the correlated multicast transfer port;
    a snooping module configured to delete, from the snooping information, a communication port has been set to the multicast transfer port, based on snooping with respect to a multicast leaving message for notifying of leaving from the multicast group; and
    a withdrawal sending module configured to send the multicast leaving message to a source of the multicast frame, when the snooping information includes no communication port is set to the multicast transfer port.

12. The network relay device according to claim 11, further comprising:
    a failure detector configured to detect a communication failure in the layer 2 network; and
    a port adding module configured to, in response to detection of the communication failure by the failure detector, additionally set other of the plurality of communication ports to the multicast transfer port, so as to update the snooping information stored in the transfer information storage unit.

* * * * *